United States Patent [19]
Komazaki et al.

[11] Patent Number: 5,840,806
[45] Date of Patent: Nov. 24, 1998

[54] CURABLE RESIN COMPOSITIONS

[75] Inventors: Shigeru Komazaki, Izumi; Shinichi Kudo, Izumiotsu; Masataka Ooka, Nara, all of Japan

[73] Assignee: Dainippon Ink and Chemicals, Inc., Tokyo, Japan

[21] Appl. No.: 750,980

[22] PCT Filed: May 8, 1996

[86] PCT No.: PCT/JP96/01212

§ 371 Date: Jan. 7, 1997

§ 102(e) Date: Jan. 7, 1997

[87] PCT Pub. No.: WO96/35755

PCT Pub. Date: Nov. 14, 1996

[30] Foreign Application Priority Data

May 9, 1995  [JP]  Japan ..................................... 7-110534

[51] Int. Cl.$^6$ ........................ C08L 33/02; C08L 33/14; C08L 43/04; C08L 61/20; C08L 63/00; C08L 67/02; C08L 75/04; C08L 83/06
[52] U.S. Cl. ........................ 525/101; 525/100; 525/104; 525/106; 525/199; 525/207; 525/208; 525/217; 525/218; 525/220; 525/221; 525/222; 525/231; 525/438; 525/439; 525/440; 525/443; 525/444; 525/444.5; 525/445; 525/446; 525/454; 525/455; 525/456; 525/457; 525/458; 525/461; 525/476; 525/477; 525/478; 525/479
[58] Field of Search ..................................... 525/100, 101, 525/104, 106, 199, 207, 208, 217, 218, 220, 221, 222, 231, 438, 439, 440, 443, 444, 444.5, 445, 446, 454, 455, 456, 457, 458, 461, 476

[56] References Cited

U.S. PATENT DOCUMENTS

| | | | |
|---|---|---|---|
| 5,066,720 | 11/1991 | Ohsugi et al. | 525/476 |
| 5,087,286 | 2/1992 | Fukuda et al. | 525/155 |
| 5,102,960 | 4/1992 | Imai et al. | 525/476 |
| 5,330,796 | 7/1994 | Kasari et al. | 427/407.1 |
| 5,362,521 | 11/1994 | Ozaki et al. | 427/410 |
| 5,498,666 | 3/1996 | Nambu et al. | 525/100 |
| 5,530,063 | 6/1996 | Nagai et al. | 525/101 |

FOREIGN PATENT DOCUMENTS

| | | |
|---|---|---|
| 38 38 185 | 6/1989 | Germany . |
| 54-76698 | 6/1979 | Japan . |
| 59-202224 | 11/1984 | Japan . |
| 1-129066 | 5/1989 | Japan . |
| 2-49079 | 2/1990 | Japan . |
| 2 212 163 | 3/1992 | United Kingdom . |

*Primary Examiner*—Robert E. Sellers
*Attorney, Agent, or Firm*—Armstrong, Westerman, Hattori, McLeland & Naughton

[57] ABSTRACT

Disclosed is a curable resin composition which can be applied for various uses such as top-coating compositions for cars, coating compositions for exterior walls of constructions, heat-resistant coating compositions, adhesives, ink compositions, compositions to be infiltrated into fibers and paper, and surface-treating compositions. The composition comprises (A) a resin obtained by condensation of a polymer having both a hydrolyzable silyl group and a particular functional group except such a hydrolyzable silyl group, and a particular polysiloxane, and (B) a compound capable of reacting with the functional group existing in the resin (A).

11 Claims, No Drawings

CURABLE RESIN COMPOSITIONS

TECHNICAL FIELD

The present invention relates to novel and useful, curable resin compositions. More precisely, it relates to novel, curable resin compositions with high practicability, which can be cured into crosslinked products having good durability, acid resistance and scratch resistance and which comprise (A) a resin to be obtained by condensation of a polymer having both a hydrolyzable silyl group and a functional group except such a hydrolyzable silyl group, and a polysiloxane having a hydroxyl group bonded to a silicon atom and/or a hydrolyzable group bonded to a silicon atom, and (B) a compound having a functional group capable of reacting with the functional group contained in the resin (A), and optionally (C) a curing catalyst.

Such novel, curable resin compositions of the present invention are widely used, for example, in top-coating compositions for cars and coating compositions for exterior walls of constructions, which are required to have high durability, acid resistance and scratch resistance, and also in heat-resistant coating compositions, adhesives, ink compositions, compositions to be infiltrated into fibers and paper, and surface-treating compositions.

BACKGROUND ART

Various curable resin compositions capable of being cured into cured products with good durability have heretofore been widely used, which comprise various resin components such as acrylic polymers, polyester resins or alkyd resins having a so-called functional group such as a hydroxyl group, a carboxyl group or an amino group, and various curing agents such as polyisocyanate resins, epoxy resins or amino resins.

However, the cured resin films obtained from such conventional, curable resin compositions have poor durability since their gloss and water repellency are easily lowered after outdoor exposure. Therefore, the conventional compositions have a problem that they could not be almost applied to the objects that are required to have high durability.

If the conventional compositions are used for the top coats of cars, the top coats will be relatively easily etched by acid rain, and will be even relatively easily damaged by automatic car washers.

Accordingly, it is impossible to obtain cured resin films with high practicability including good durability, acid resistance and scratch resistance, from such conventional, curable resin compositions. Given the situation, therefore, it is strongly desired to develop novel, curable resin compositions capable of forming cured films having good durability, such as good gloss retention and good water repellency retention even after outdoor exposure, and further having good acid resistance and good scratch resistance.

In consideration of these, we, the present inventors have assiduously studied to obtain curable resin compositions with high practicability that can form cured films having good durability, acid resistance and scratch resistance.

Accordingly, the subject matter of the present invention is to provide novel, curable resin compositions with high practicability, which can form cured films having especially good durability, acid resistance and scratch resistance.

DISCLOSURE OF THE INVENTION

In consideration of the current situation as mentioned above and in order to attain the subject matter of the present invention as mentioned above, we, the present inventors have assiduously studied and, as a result, have found that (i) a curable resin composition comprising (A) a resin obtained by condensation of a polymer having both a hydrolyzable silyl group and a functional group except such a hydrolyzable silyl group, and a particular polysiloxane, and (B) a compound having a functional group capable of reacting with the functional group attached to the resin (A), or (ii) a curable resin composition comprising (A) a resin obtained by condensation of a polymer having both a hydrolyzable silyl group and a functional group except such a hydrolyzable silyl group, and a particular polysiloxane, and (B) a compound having a functional group capable of reacting with the functional group attached to the resin (A), and (C) a curing catalyst can give a cured film having excellent characteristics or, precisely, having good gloss retention, water repellency retention, acid resistance and scratch resistance. On the basis of these findings, we confirmed that the subject matter of the invention mentioned above can be attained by the curable resin compositions mentioned above, and have herein completed the present invention.

Specifically, the present invention is to provide, in principle, a curable resin composition with high practicability, which can form a cured film having good gloss retention, water repellency retention, acid resistance and scratch resistance, and which substantially comprises (A) a resin obtained by condensation of (a-1) a polymer having both a hydrolyzable silyl group and a functional group except such a hydrolyzable silyl group, and (a-2) a polysiloxane having a hydroxyl group bonded to a silicon atom and/or a hydrolyzable group bonded to a silicon atom, and (B) a compound having a functional group capable of reacting with the functional group attached to said resin (A), or comprises (A) a resin obtained by condensation of (a-1) a polymer having both a hydrolyzable silyl group and a functional group except such a hydrolyzable silyl group, and (a-2) a polysiloxane having a hydroxyl group bonded to a silicon atom and/or a hydrolyzable group bonded to a silicon atom, (B) a compound having a functional group capable of reacting with the functional group attached to said resin (A), and (C) a curing catalyst.

BEST MODES OF CARRYING OUT THE INVENTION

The present invention is described in more detail hereinafter.

The polymer (a-1) having both a hydrolyzable silyl group and a functional group except such a hydrolyzable silyl group [polymer (a-1) with both a hydrolyzable silyl group and a functional group except said silyl group], which is used for preparing the above-mentioned resin (A), one essential component to be in the curable resin composition of the invention, includes various polymers having both a hydrolyzable silyl group and any of other known various functional groups. Typical examples of such various functional groups include, though not limited, a hydroxyl group, a blocked hydroxyl group, a carboxyl group, a blocked carboxyl group, a carboxylic acid anhydride group, an amino group, a cyclocarbonate group, a linear carbonate group, an epoxy group, a primary amido bond, a secondary amido bond, a carbamate group, an oxazoline group, a carbonyl group, an acetoacetyl group, a phosphoric acid group, a sulfonic acid group, and a functional group represented by the following structural formula (I):

The secondary amido bond includes, for example, an N-hydroxymethylamido bond, an N-alkoxymethylamido bond, and a functional group represented by the following structural formula (II):

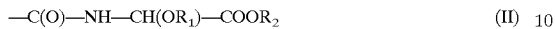

wherein $R_1$ and $R_2$ may be the same or different and each represents a hydrogen atom, an alkyl group having from 1 to 8 carbon atoms, or an aryl group.

Needless-to-say, the polymer (a-1) may have one of such functional groups, or even two or more of them, for example, a combination of a cyclocarbonate group and a carboxyl group.

Of these functional groups, especially preferred are a hydroxyl group, a blocked hydroxyl group, a carboxyl group, a blocked carboxyl group, a carboxylic acid anhydride group, an amino group, a cyclocarbonate group, an epoxy group, a primary amido bond, a secondary amido bond, a carbamate group and a functional group of formula (I).

Typical examples of the polymer (a-1) include, though not limited, various vinyl polymers, such as acrylic polymers, fluoroolefin polymers, vinyl ester polymers and aromatic vinyl polymers; and also polyester resins, alkyd resins and polyurethane resins.

Of these, especially preferred are so-called vinyl polymers such as acrylic polymers, and also polyurethane resins.

To prepare vinyl polymers that fall within the scope of the polymer (a-1), various known methods can be employed. As one typical but not limited example of such known methods, herein employable is a simple method which comprises copolymerizing at least one monomer selected from a group consisting of hydroxyl group-containing vinyl monomers, blocked hydroxyl group-containing vinyl monomers, carboxyl group-containing vinyl monomers, blocked carboxyl group-containing vinyl monomers, carboxylic acid anhydride group-containing vinyl monomers, amino group-containing vinyl monomers, cyclocarbonate group-containing vinyl monomers, epoxy group-containing vinyl monomers, primary amido bond-containing vinyl monomers, secondary amido group-containing vinyl monomers, carbamate group-containing vinyl monomers and vinyl monomers having the functional group of formula (I); or a monomer having two or more of functional groups such as those mentioned above, and a hydrolyzable silyl group-containing vinyl monomer, or copolymerizing a monomer having any of functional groups such as those mentioned above, a hydrolyzable silyl group-containing monomer, and any other vinyl monomer capable of copolymerizing with these.

Typical but not limited examples of the hydroxyl group-containing vinyl monomers, which can be used in preparing the vinyl polymer (a-1) for use in the present invention, include;

various hydroxyalkyl (meth)acrylates such as 2-hydroxyethyl (meth)acrylate, 2-hydroxypropyl (meth)acrylate and 4-hydroxybutyl (meth)acrylate; various hydroxyl group-containing vinyl ethers such as 2-hydroxyethyl vinyl ether and 4-hydroxybutyl vinyl ether;

various hydroxyl group-containing allyl ethers such as 2-hydroxyethyl allyl ether; monoesters of polyoxyalkylene glycols obtained from various polyether polyols such as polyethylene glycol, and various unsaturated carboxylic acids such as (meth)acrylic acid;

adducts of various hydroxyl group-containing monomers such as those mentioned above, and various lactones such as ε-caprolactone; adducts of various epoxy group-containing unsaturated monomers such as glycidyl (meth)acrylate, and various acids such as acetic acid;

and also other various hydroxyl group-containing monomers, exemplified by adducts of various unsaturated carboxylic acids, such as typical (meth)acrylic acid, and various monoepoxy compounds, except epoxides of α-olefins, such as "Cardula E" (trade name, produced by Shell Co., Holland).

Typical but not limited examples of the blocked hydroxyl group-containing vinyl monomers, which can be used in preparing the polymer (a-1) for use in the present invention, include;

silyl ether group-containing vinyl monomers such as those disclosed in Unexamined Japanese Patent Publication SHO 62-283163, whose examples include 2-trimethylsiloxyethyl (meth)acrylate, 2-trimethylsiloxypropyl (meth)acrylate, 4-trimethylsiloxybutyl (meth)acrylate, 2-trimethylsiloxyethyl vinyl ether, and 4-trimethylsiloxybutyl vinyl ether;

acetal group or ketal group-containing vinyl monomers such as those disclosed in Unexamined Japanese Patent Publication HEI 4-41515, whose examples include 2-(1-ethoxy) ethoxyethyl (meth)acrylate, 2-(1-n-butoxy)ethoxyethyl (meth)acrylate, 2-[2-(meth) acryloyloxy]ethoxytetrahydrofuran, and 2,2-dimethyl-4-(meth)acryloyloxymethyldioxorane; and oxazolidine group-containing vinyl monomers, such as 3-[2-(meth)acryloyloxy]ethyloxazolidine, 2,2-dimethyl-3-[2-(meth)acryloyloxy]ethyloxazolidine, and 2-isobutyl-2-methyl-3-[2-(meth) acryloyloxy] ethyloxazolidine.

Typical but not limited examples of the carboxyl group-containing vinyl monomers, which may be used in preparing the polymer (a-1) for use in the present invention, include;

various unsaturated carboxylic acids, such as (meth) acrylic acid, 2-carboxyethyl (meth)acrylate, crotonic acid, itaconic acid, maleic acid, and fumaric acid;

monoesters (half-esters) of unsaturated dicarboxylic acids and saturated monoalcohols, such as monomethyl itaconate, mono-n-butyl itaconate, monomethyl maleate, mono-n-butyl maleate, monomethyl fumarate, and mono-n-butyl fumarate; monovinyl esters of various saturated dicarboxylic acids, such as monovinyl adipate and monovinyl succinate;

addition-reaction products of various saturated polycarboxylic acid anhydrides, such as succinic anhydride, glutaric anhydride, phthalic anhydride or trimellitic anhydride, and various hydroxyl group-containing vinyl monomers such as those mentioned above; and also monomers obtained by addition reaction of various carboxyl group-containing monomers such as those mentioned above, and lactones.

Typical but not limited examples of the blocked carboxyl group-containing monomers, which can be used in preparing the polymer (a-1) for use in the present invention, include;

various silyl ester group-containing vinyl monomers such as those disclosed in Unexamined Japanese Patent Publication SHO 62-254876, whose examples include trimethylsilyl (meth)acrylate, dimethyl-tert-butylsilyl (meth)acrylate, and trimethylsilyl crotonate;

hemiacetal ester group-containing or hemiketal ester group-containing monomers such as those disclosed in Unexamined Japanese Patent Publication HEI 5-222134, whose examples include, 1-ethoxyethyl (meth)acrylate, 1-n-butoxyethyl (meth)acrylate, 2-methoxy-2-(meth)acryloyloxypropane, and 2-(meth)acryloyloxytetrahydrofuran; and tert-butyl ester group-containing monomers, such as tert-butyl (meth)acrylate, and tert-butyl crotonate.

Typical but not limited examples of the carboxylic acid anhydride group-containing monomers, which can be used in preparing the polymer (a-1) for use in the present invention, include;

various unsaturated polycarboxylic acid anhydrides such as maleic anhydride, and itaconic anhydride; various unsaturated monocarboxylic acid anhydrides such as acrylic anhydride, and methacrylic anhydride; and mixed acid anhydrides of various unsaturated carboxylic acids, such as acrylic acid and methacrylic acid, and various saturated carboxylic acids such as propionic acid and benzoic acid.

Typical but not limited examples of the amino group-containing vinyl monomers, which can be used in preparing the polymer (a-1) for use in the present invention, include;

various tertiary amino group-containing (meth)acrylates, such as 2-dimethylaminoethyl (meth)acrylate, 2-diethylaminoethyl (meth)acrylate, 2-di-n-propylaminoethyl (meth)acrylate, 3-dimethylaminopropyl (meth)acrylate, 4-dimethylaminobutyl (meth)acrylate, and N-[2-(meth)acryloyloxy]ethylmorpholine;

various tertiary amino group-containing aromatic vinyl monomers, such as vinylpyridine, N-vinylcarbazole, and N-vinylquinoline;

various tertiary amino group-containing (meth)acrylamides, such as N-(2-dimethylamino)ethyl(meth)acrylamide, N-(2-diethylamino)ethyl(meth)acrylamide, N-(2-di-n-propylamino) ethyl(meth)acrylamide, N-(3-dimethylamino)propyl(meth)acrylamide, N-(4-dimethylamino)butyl(meth)acrylamide, and N-[2-(meth)acrylamido]ethylmorpholine;

various tertiary amino group-containing crotonic acid amides, such as N-(2-dimethylamino)ethylcrotonic acid amide, N-(2-diethylamino)ethylcrotonic acid amide, N-(2-di-n-propylamino)ethylcrotonic acid amide, N-(3-dimethylamino)propylcrotonic acid amide, and N-(4-dimethylamino)butylcrotonic acid amide; and various tertiary amino group-containing vinyl ethers, such as 2-dimethylaminoethyl vinyl ether, 2-diethylaminoethyl vinyl ether, 3-dimethylaminopropyl vinyl ether, and 4-dimethylaminobutyl vinyl ether.

Typical but not limited examples of the cyclocarbonate group-containing vinyl monomers, which can be used in preparing the polymer (a-1) for use in the present invention, include;

5-membered cyclocarbonate group-containing vinyl monomers, such as 2,3-carbonatopropyl (meth)acrylate, 2-methyl-2,3-carbonatopropyl (meth)acrylate, 3,4-carbonatobutyl (meth)acrylate, 3-methyl-3,4-carbonatobutyl (meth)acrylate, 4-methyl-3,4-carbonatobutyl (meth)acrylate, 4,5-carbonatopentyl (meth)acrylate, 6,7-carbonatohexyl (meth)acrylate, 5-ethyl-5,6-carbonatohexyl (meth)acrylate, 7,8-carbonatooctyl (meth)acrylate, 2,3-carbonatopropyl vinyl ether, di(2,3-carbonatopropyl) maleate, and di(2,3-carbonatopropyl) itaconate; and 6-membered cyclocarbonate group-containing vinyl monomers, such as [5-N-(meth)acryloylcarbamoyloxy]methyl-5-ethyl-1,3-dioxan-2-one, 5-[N-{2-(meth)acryloyloxy}ethylcarbamoyloxy]methyl-5-ethyl-1,3-dioxan-2-one, 5-ethyl-5-(meth)acryloyloxymethyl-1,3-dioxan-2-one, and 4-(5-ethyl-2-oxo-1,3-dioxan-5-yl) methoxymethylstyrene.

Typical but not limited examples of the epoxy group-containing vinyl monomers, which can be used in preparing the polymer (a-1) for use in the present invention, include;

monomers such as glycidyl (meth)acrylate, methylglycidyl (meth)acrylate, 3,4-epoxycyclohexylmethyl (meth)acrylate, vinylcyclohexene oxide, glycidyl vinyl ether, methylglycidyl vinyl ether, and allyl glycidyl ether.

Typical but not limited examples of the primary amido bond-or secondary amido bond-containing vinyl monomers, which can be used in preparing the polymer (a-1) for use in the present invention, include;

(meth)acrylamide, N-isopropyl(meth)acrylamide, N-methyl(meth)acrylamide, N-vinylformamide, methyl (meth)acrylamidoglycolate, methyl (meth)acrylamidoglycolate methyl ether, N-methylol(meth)acrylamide, N-n-butoxymethyl(meth)acrylamide, and addition-reaction products of 2-isocyanatoethyl (meth)acrylate and acetylacetone or acetoacetate esters.

Typical but not limited examples of the carbamate group-containing vinyl monomers, which can be used in preparing the polymer (a-1) for use in the present invention, include;

methyl N-(meth)acryloylcarbamate, ethyl N-(meth)acryloylcarbamate, ethyl N-[2-(meth)acryloyloxy]ethylcarbamate, 2-carbamoyloxyethyl (meth)acrylate, 2-(N-methylcarbamoyloxy)ethyl (meth)acrylate, 2-(N-ethylcarbamoyloxy)ethyl (meth)acrylate, addition-reaction product of 3-isopropenyl-α, α-dimethylbenzyl isocyanate and 2-hydroxypropyl carbamate, addition-reaction product of 2-isocyanatoethyl (meth)acrylate and phenol, addition-reaction product of 2-isocyanatoethyl (meth)acrylate and ethanol, and addition-reaction product of 2-isocyanatoethyl (meth)acrylate and methyl ethyl ketoxime.

Typical but not limited examples of the vinyl monomers having a functional group of formula (I), which can be used in preparing the polymer (a-1) for use in the present invention, include;

addition-reaction product of 2-isocyanatoethyl (meth)acrylate and ε-caprolactam, and addition-reaction product of 2-isocyanatoethyl (meth)acrylate and γ-butyrolactam.

Typical but not limited examples of the vinyl monomers having two or more functional groups such as those mentioned above, which can be used in preparing the polymer (a-1) for use in the present invention, include monomers such as mono-(hydroxyethyl) itaconate, and mono(2,3-carbonatopropyl) itaconate.

The hydrolyzable silyl group-containing vinyl monomers which are used in preparing the polymer (a-1) for use in the present invention are defined as vinyl monomers having a so-called hydrolyzable silyl group capable of being hydrolyzed to give a silanol group, such as that represented by the following general formula (III):

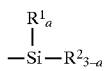

(III)

wherein $R^1$ represents a monovalent organic group, such as an alkyl group, an aryl group or an aralkyl group; $R^2$ represents a hydrogen atom, a halogen atom, an alkoxy group, an acyloxy group, a phenoxy group, an aryloxy group, a mercapto group, an amino group, an amido group, an aminoxy group, an iminoxy group, or an alkenyloxy group; and a represents an integer of 0, 1 or 2.

Typical but not limited examples of such hydrolyzable silyl group-containing vinyl monomers include vinyltrimethoxysilane, vinyltriethoxysilane, vinyl-tri-n-butoxysilane, vinylmethyldimethoxysilane, vinyl-tris(β-methoxyethoxy)silane, allyltrimethoxysilane, 2-trimethoxysilylethyl vinyl ether, 2-triethoxysilylethyl vinyl ether, 2-(methyldimethoxysilyl)ethyl vinyl ether, 3-trimethoxysilylpropyl vinyl ether, 3-trimethoxysilylpropyl vinyl ether, 3-(methyldimethoxysilyl)propyl vinyl ether, 3-(methyl)acryloyloxypropyltriethoxysilane, 3-(meth)acryloyloxypropyltriethoxysilane, 3-(meth)acryloyloxypropylmethyldimethoxysilane, and 3-(meth)acryloyloxypropylmethyldichlorosilane.

Typical but not limited examples of other vinyl monomers capable of copolymerizing with various functional group-containing vinyl monomers such as those mentioned above, which can be used in preparing the polymer (a-1) for use in the present invention in the manner mentioned above, include;

- esters of primary or secondary, $C_{1-22}$ alkyl alcohols and (meth)acrylic acid, such as methyl (meth)acrylate, ethyl (meth)acrylate, n-propyl (meth)acrylate, n-butyl (meth)acrylate, isobutyl (meth)acrylate, 2-ethylhexyl (meth)acrylate, and lauryl (meth)acrylate;
- various aralkyl (meth)acrylates, such as benzyl (meth)acrylate and 2-phenylethyl (meth)acrylate; various cycloalkyl (meth)acrylates, such as cyclohexyl (meth)acrylate and isobornyl (meth)acrylate; various (ω-alkoxyalkyl (meth)acrylates, such as 2-methoxyethyl (meth)acrylate and 4-methoxybutyl (meth)acrylate;
- various aromatic vinyl monomers, such as styrene, p-tert-butylstyrene, α-methylstyrene and vinyltoluene; various vinyl carboxylates, such as vinyl acetate, vinyl propionate, vinyl pivalate, vinyl versatate and vinyl benzoate;
- alkyl crotonates, such as methyl crotonate and ethyl crotonate; dialkyl esters of various unsaturated dibasic acids, such as dimethyl maleate, di-n-butyl maleate, dimethyl fumarate, di-n-butyl fumarate, dimethyl itaconate and di-n-butyl itaconate;
- various cyano group-containing monomers such as (meth)acrylonitrile and crotononitrile; various fluoroolefins such as vinyl fluoride, vinylidene fluoride, tetrafluoroethylene, chlorotrifluoroethylene and hexafluoropropylene; various chloroolefins such as vinyl chloride and vinylidene chloride; various α-olefins such as ethylene, propylene, isobutylene, 1-butene and 1-hexene;
- various alkyl vinyl ethers such as ethyl vinyl ether, n-butyl vinyl ether, isobutyl vinyl ether and n-hexyl vinyl ether; various cycloalkyl vinyl ethers such as cyclopentyl vinyl ether, cylcohexyl vinyl ether and 4-methylcyclohexyl vinyl ether;
- tertiary amido bond-containing monomers such as N,N-dimethyl (meth)acrylamide, N-(meth) acryloylmorpholine, N-(meth) acryloylpyrrolidine and N-vinylpyrrolidone;
- various polyether-containing monomers, as exemplified by esters of polyethers having one hydroxyl group in one molecule, such as methoxypolyethylene glycol or methoxypolypropylene glycol, and (meta)acrylic acid.

To prepare the polymer (a-1) from various monomers such as those mentioned above, employable are any known polymerization methods such as solution polymerization, non-aqueous dispersion polymerization and bulk polymerization. Of these, especially preferred is a solution-radical polymerization method conducted in organic solvents, as being the simplest.

Needless-to-say, various known compounds can be used as the polymerization initiators in the solution-radical polymerization method. Typical but not limited examples of the polymerization initiators include;

- various azo compounds such as 2,2'-azobis (isobutyronitrile), 2,2'-azobis(2,4-dimethylvaleronitrile) and 2,2'-azobis(2-methylbutyronitrile); and
- various peroxides such as tert-butyl peroxypivalate, tert-butyl peroxybenzoate, tert-butyl peroxy-2-ethylhexanoate, benzoyl peroxide, lauroyl peroxide, acetyl peroxide, di-tert-butyl peroxide, dicumyl peroxide, tert-butyl hydroperoxide, cumene hydroperoxide, methyl ethyl ketone peroxide, and diisopropyl peroxycarbonate.

Various known organic solvents can be used in the solution-radical polymerization method. Needless-to-say, such organic solvents can be used therein either singly or as combined.

Typical but not limited examples of the solvents include various aliphatic or alicyclic hydrocarbons, such as hexane, heptane, octane, cyclohexane, cyclopentane and cyclooctane; various aromatic hydrocarbons, such as toluene, xylene and ethylbenzene; various esters, such as ethyl acetate, butyl acetate, amyl acetate, ethylene glycol monomethyl ether acetate, ethylene glycol monoethyl ether acetate, and ethylene glycol monobutyl ether acetate; various alcohols, such as methanol, ethanol, n-propanol, i-propanol, n-butanol, i-butanol, sec-butanol, tert-butanol, n-amyl alcohol, i-amyl alcohol, tert-amyl alcohol, ethylene glycol monomethyl ether, ethylene glycol monoethyl ether, and ethylene glycol monobutyl ether; various ketones, such as acetone, methyl ethyl ketone, methyl isobutyl ketone, methyl amyl ketone, and cyclohexanone; various ethers, such as dimethoxyethane, tetrahydrofuran, dioxane, diisopropyl ether, and di-n-butyl ether; various chlorinated hydrocarbons, such as chloroform, methylene chloride, carbon tetrachloride, trichloroethane, and tetrachloroethane; and also N-methylpyrrolidone, dimethylformamide, dimethylacetamide, and ethylene carbonate.

Where any of the above-mentioned, carboxyl group-containing vinyl monomers is used as the functional group-containing monomer in preparing the polymer (a-1), if its amount used is too much, the products are often gelled during the polymerization.

In order to prevent the gelation, it may be recommended to use any hydrolyzable ester, such as ethyl orthoacetate, ethyl ortho-n-butyrate, ethyl orthoformate, ethyl orthopropionate or methyl orthoformate, along with the solvent such as that mentioned above.

The monomers such as those mentioned above can be polymerized in the presence of the polymerization initiator and the solvent such as those mentioned above, according to known solution-radical polymerization, to give the vinyl polymer (a-1) having both a functional group and a hydrolyzable silyl group.

The amount of at least one functional group, which is selected from the group consisting of a hydroxyl group, a blocked hydroxyl group, a carboxyl group, a blocked carboxyl group, a carboxylic acid anhydride group, an amino group, a cyclocarbonate group, an epoxy group, a primary amido bond, a secondary amido bond, a carbamate group and the functional group of formula (I) mentioned above, or the total of two or more such functional groups that shall be introduced into the vinyl polymer (a-1) is suitably from about 0.1 to about 6 mols, preferably from 0.2 to 5 mols, more preferably from 0.3 to 4 mols, per 1,000 g of the solids of the vinyl polymer (a-1).

If the amount or the total is less than about 0.1 mols, the curability of the composition is inevitably lowered, finally resulting in the reduction in the durability of the cured product obtained from the composition. On the other hand, if it is much more than about 6 mols, the water resistance and the chemical resistance of the cured product are lowered. Therefore, the introduction of such a too small or too large amount of the functional group(s) into the polymer (a-1) is unfavorable.

The amount of the hydrolyzable silyl group introduced into the vinyl polymer (a-1) is suitably from about 0.005 to about 3 mols, preferably from 0.01 to 2 mols, more preferably from 0.05 to 1 mol. per 1,000 g of the solids of the polymer (a-1).

If the amount is less than about 0.005 mols, the condensation of the vinyl polymer (a-1) and the polysiloxane (a-2) having a hydroxyl group and/or a hydrolyzable group bonded to a silicon atom is inevitably difficult to proceed, finally resulting in the reduction in the durability of the cured product. On the other hand, if it is much more than about 3 mols, the viscosity of the condensate solution often increases during the condensation, thereby unfavorably resulting in gel formation. Therefore, the introduction of such a too small or too large amount of the hydrolyzable silyl group into the polymer (a-1) is unfavorable.

The vinyl polymer (a-1) for use in the present invention shall suitably have a number average molecular weight of from about 300 to about 100,000, preferably from 600 to 50,000, more preferably from 600 to 30,000.

If the number average molecular weight is smaller than about 300, the curability of the composition and also the mechanical strength of the cured product are inevitably lowered. On the other hand, if it is much larger than about 100,000, the non-volatile content of the composition is inevitably too much lowered, thereby resulting in the reduction in the workability, especially the coating workability of the composition. Therefore, it is undesirable for the polymer (a-1) to have such a too small or too large number average molecular weight.

As the vinyl polymer (a-1) for use in the present invention, also employable is any of polyester resins and alkyd resins grafted with vinyl polymer segments having both at least one functional group selected from the group consisting of a hydroxyl group, a blocked hydroxyl group, a carboxyl group, a blocked carboxyl group, an acid anhydride group, an amino group, a cyclocarbonate group, an epoxy group, a primary amido bond, a secondary amido bond, a carbamate group and the functional group of formula (I) mentioned above, and a hydrolyzable silyl group, which are obtained by radical polymerization of various vinyl monomers consisting essentially of at least one monomer selected from the group consisting of hydroxyl group-containing monomers, blocked hydroxyl group-containing monomers, carboxyl group-containing monomers, blocked carboxyl group-containing monomers, carboxylic acid anhydride group-containing monomers, amino group-containing monomers, cyclocarbonate group-containing monomers, epoxy group-containing monomers, primary amido bond-containing monomers, secondary amido bond-containing monomers, carbamate group-containing monomers and monomers having the functional group of formula (I) mentioned above, or at least one monomer having two or more functional groups such as those mentioned above, and a hydrolyzable silyl group-containing monomer, in the presence of polymers having a polymerizable, unsaturated double bond, except vinyl polymers, such as polyester resins or alkyd resins.

The other essential component to be used for preparing the resin (A), which is essential in the curable resin composition of the present invention, is the polysiloxane (a-2) having a hydroxyl group bonded to a silicon atom which is generally referred to as a silanol group, and/or a hydrolyzable group bonded to a silicon atom, such as that mentioned above.

The hydrolyzable group bonded to a silicon atom as referred to herein is defined as a group that can be hydrolyzed to give a hydroxyl group bonded to a silicon atom Examples of the hydrolyzable group include a hydrogen atom, a halogen atom, an alkoxyl group, a substituted alkoxyl group, an acyloxy group, a phenoxy group, a mercapto group, an amino group, an amido bond, an aminoxy group, an iminoxy group and an alkenyloxy group each bonded to a silicon atom.

Typical but not limited examples of the polysiloxane (a-2) include hydrolysis-condensation products of silicon compounds having, in one molecule, at least two hydrolyzable groups bonded to a silicon atom, which are prepared by hydrolysis and condensation of said silicon compounds, and also partial hydrolysis-condensation products of such silicon compounds, which are prepared by partial hydrolysis and condensation of said silicon compounds.

To prepare the resin (A) for use in the present invention, therefore, employable, as the polysiloxane (a-2), is any of hydrolysis-condensation products or partial hydrolysis-condensation products of silicon compounds having, in one molecule, at least two hydrolyzable groups bonded to a silicon atom, which can be prepared in the manner that will be mentioned hereinafter.

As such silicon compounds having, in one molecule, at least two hydrolyzable groups bonded to a silicon atom. Any known compounds can be employed herein. Typical but not limited examples of the silicon compounds employable herein include silicon compounds represented by a general formula (IV):

$$R^3{}_b SiR^4{}_{4-b} \qquad (IV)$$

(wherein $R^3$ represents a monovalent organic group, such as an alkyl group, an aryl group, an aralkyl group or an alkenyl group, which may have or may not have a substituent; $R^4$ represents a hydrogen atom, a halogen atom, an alkoxy group, a substituted alkoxy group, an acyloxy group, a phenoxy group, a mercapto group, an amino group, an amido bond, an aminoxy group, an iminoxy group, or an alkenyloxy group; and b represents an integer of 0, 1 or 2); partial hydrolysis-condensation products obtained by partial hydrolysis and condensation of one of such silicon compounds; partial co-hydrolysis-condensation products obtained by partial hydrolysis and condensation of two or more such silicon compounds; and also silicon compounds having two or more hydrolyzable silyl groups in one molecule, such as $(CH_3CH_2O)_3SiCH_2CH_2Si(OCH_2CH_3)_3$, and $(CH_3CH_2O)_3SiCH_2CH_2CH_2Si(OCH_2CH_3)_3$.

Typical but not limited examples of the silicon compounds of formula (IV) mentioned above includes;

various tetraalkoxysilanes, such as tetraethoxysilane, tetramethoxysilane, and tetra-n-butoxysilane;

various organotrialkoxysilanes, such as methyltrimethoxysilane, methyltriethoxysilane, methyl-tri-n-butoxysilane, ethyltrimethoxysilane, ethyltriethoxysilane, ethyl-tri-n-butoxysilane, n-propyltrimethoxysilane, n-propyltriethoxysilane, n-butyltrimethoxysilane, n-butyltriethoxysilane, phenyltrimethoxysilane, phenyltriethoxysilane, phenyl-tri-n-butoxysilane, vinyltrimethoxysilane, vinyltriethoxysilane, vinyl-tri-n-butoxysilane, vinyltris(β-methoxyethoxy)silane, allyltrimethoxysilane, 2-trimethoxysilylethyl vinyl ether, 2-triethoxysilylethyl vinyl ether, 3-trimethoxysilylpropyl vinyl ether, 3-triethoxysilylpropyl vinyl ether, 3-(meth)acryloyloxypropyltrimethoxysilane, and 3-(meth)acryloyloxypropyltriethoxysilane;

various diorganodialkoxysilanes, such as dimethyldimethoxysilane, dimethyldiethoxysilane, dimethyl-di-n-butoxysilane, diethyldimethoxysilane, diethyldiethoxysilane, di-n-propyldimethoxysilane, di-n-propyldiethoxysilane, di-n-butyldimethoxysilane, di-n-butyldiethoxysilane, diphenyldimethoxysilane, diphenyldiethoxysilane, diphenyl-di-n-butoxysilane, methylphenyldimethoxysilane, methylphenyldiethoxysilane, vinylmethyldimethoxysilane, 2-(methyldimethoxysilyl)ethyl vinyl ether, 3-(methyldimethoxysilyl)propyl vinyl ether, and 3-(meth)acryloyloxypropylmethyldimethoxysilane;

various chlorosilanes, such as tetrachlorosilane, methyltrichlorosilane, ethyltrichlorosilane, n-propyltrichlorosilane, phenyltrichlorosilane, vinyltrichlorosilane, 3-(meth)acryloyloxypropyltrichlorosilane, dimethyldichlorosilane, diethyldichlorosilane, diphenyldichlorosilane, methylphenyldichlorosilane, vinylmethyldichlorosilane, and 3-(meth)acryloyloxypropylmethyldichlorosilane; and various acetoxysilanes, such as tetraacetoxysilane, methyltriacetoxysilane, phenyltriacetoxysilane, dimethyldiacetoxysilane, and diphenyldiacetoxysilane.

Of these various silicon compounds, especially preferred are tetraalkoxysilanes, organotrialkoxysilanes and diorganodialkoxysilanes, and also their partial hydrolysis-condensation products and partial co-hydrolysis-condensation products.

Of such silicon compounds, when tetra-functional silicon compounds such as tetraethoxysilane, are used, it is desirable that they are combined with di-or tri-functional silicon compounds in order to prevent gelation during condensation and also to improve the storage stability of the resin solutions obtained.

To prepare the polysiloxane (a-2), the above-mentioned silicon compounds can be combined with any of so-called, mono-functional silicon compounds having, in one molecule, one hydrolyzable group bonded to a silicon atom. Examples of such monofunctional silicone compounds include trimethylmethoxysilane, trimethylethoxysilane, triethylmethoxysilane, triethylethoxysilane, triphenylmethoxysilane, and triphenylethoxysilane.

Hydrolysis-condensation or partial hydrolysis-condensation of any of the above-mentioned silicon compounds gives hydrolysis-condensation products or partial hydrolysis-condensation products that can be used herein as the polysiloxane (a-2), in which a catalyst may be or may not be used. In order to facilitate such condensation, it is desirable to use a catalyst.

The catalyst may be any conventional one. Needless-to-say, a combination of two or more different catalysts can be employed herein.

Typical but not limited examples of the catalyst include;

various inorganic acids, such as hydrochloric acid, sulfuric acid, and phosphoric acid; various organic acids such as p-toluenesulfonic acid, monoisoprpyl phosphate and acetic acid;

various inorganic bases such as sodium hydroxide and potassium hydroxide; various titanates, such as tetraisopropyl titanate and tetrabutyl titanate; various tin carboxylates, such as dibutyl tin dilaurate and tin octylate;

various metal carboxylates, exemplified by salts of naphthenic acid or octylic acid with various metals, such as iron, cobalt, manganese or zinc; various aluminium compounds, such as trisacetylacetonatoaluminium;

various amine compounds, such as 1,8-diazabicyclo[5.4.0]undecene-7 (DBU), 1,5-diazabidiazabicyclo[4.3.0]nonene-5 (DBN), 1,4-diazabicyclo[2.2.2]octane (DABCO), tri-n-butylamine, dimethylbenzylamine, butylamine, octylamine, monoethanolamine, diethanolamine, triethanolamine, imidazole, 1-methylimidazole, 2,4-dimethylimidazole, and 1,4-diethylimidazole; and various quaternary ammonium salts, such as tetramethylammonium salts, tetrabutylammonium salts, trimethyl(2-hydroxypropyl)ammonium salts, cyclohexyltrimethylammonium salts, tetrakis(hydroxymethyl)ammonium salts, dilauryldimethylammonium salts, trioctylmethylammonium salts, and o-trifluoromethylphenyltrimethylammonium salts, with counter anions, such as chloride, bromide, carboxylate or hydroxide.

The amount of the catalyst, if used, is suitably from about 0.0001 to about 10% by weight, preferably from 0.0005 to 3% by weight, more preferably from 0.0005 to 1% by weight, relative to the amount of the silicon compound to be hydrolyzed or partially hydrolyzed.

The amount of water to be used in the above-mentioned (partial) hydrolysis-condensation is suitably about 0.05 mols or more, preferably 0.1 mols or more, more preferably 0.2 mols or more, per 1 mol of the hydrolyzable group bonded to a silicon atom in the silicon compound to be (partially) hydrolyzed.

If the amount of water in question is smaller than 0.05 mols, the hydrolysis reaction is too slow, and such is unfavorable in the practical viewpoint. However, use of much excess amount of water in the hydrolysis, for example, 5 mols or 10 mols of water, relative to 1 mol of the silicon atom-bonded hydrolyzable group, causes no problem herein.

Needless-to-say, the catalyst and water can be added to the reaction system all at a time or intermittently in portions, or, if desired, the catalyst and water can also be added thereto either as a mixture thereof or separately from each other.

The reaction temperature for this hydrolysis-condensation reaction is suitably from 0° C. to 150° C. or so, but preferably from 20° C. to 100° C. The reaction pressure is not specifically defined, and the reaction may be conducted at ordinary pressure, or under pressure or even under reduced pressure.

If the by-products produced by the reaction, such as alcohols and water, would have some negative influences on the subsequent condensation of the polymer (a-1) and the polysiloxane (a-2) or on the stability of the curable resin composition to be obtained herein, they can be removed from the reaction mixture by any conventional method, such as distillation or the like. If they have no influence thereon, needless-to-say, they may well remain in the reaction mixture with no problem.

Organic solvents may be or may not be used in this reaction However, in order to make it easy to stir the reaction system, it is desirable to use some organic solvents.

The organic solvents, if used, may be any known ones.

Needless-to-say, they can be used either singly or as combined.

Examples of the organic solvents usable herein, are those that have been mentioned above as the organic solvents usable in preparing the vinyl polymer (a-1). If any of such organic solvents is used to prepare the polysiloxane (a-2), the concentration of the silicon compound having, in one molecule, at least two hydrolyzable groups bonded to a silicon atom in the solvent used will be desirably about 5% by weight or more.

Commercially-available polysiloxanes also can be used as the polysiloxane (a-2). As typical but not limited examples of the commercially-available polysiloxanes are linear, branched, or ladderwise-structured, hydrolysis-condensation products or partial hydrolysis-condensation products, which are now sold in the market as polysiloxane products having a silanol group or a methoxy group bonded to a silicon atom. Examples of such commercially-available polysiloxanes are "TSR-160 or 165" (trade name, produced by Toshiba Silicone Co.), "SH-6018" (trade name, produced by Toray Dow Corning Silicone Co.), and "GR-100, 908 or 950" (trade name, produced by Showa Denko KK).

Now, the condensation reaction of the above-mentioned polymer (a-1) and the polysiloxane (a-2) is described below.

In the condensation, it is desirable to define the weight ratio of the polymer (a-1) to the polysiloxane (a-2) to fall between 5/95 and 99/1 or so, preferably between 15/85 and 95/5, more preferably between 20180 and 85/15.

If the proportion of the polymer (a-1) is smaller than about 5% by weight, the proportion of the polysiloxane (a-2) shall be inevitably large, thereby resulting in that the cured film to be obtained is brittle and is therefore of little use in practice. On the other hand, however, if the proportion of the polymer (a-1) is larger than about 99% by weight, the proportion of the polysiloxane (a-2) shall be inevitably too small, thereby resulting in that a cured film with high durability is difficult to be obtained. For these reasons, use of such too small or too large amount of the polymer (a-1) is unfavorable.

A catalyst may be added thereto, so that the condensation of the polymer (a-1) and the polysiloxane (a-2) proceeds smoothly. Examples of the catalyst herein employable include those that have been mentioned above as the catalysts employable in the preparation of the polysiloxane (a-2).

Addition of any additional catalyst to this condensation reaction system may be omitted, since, in fact, the catalyst remaining in the polysiloxane (a-2) prepared in the manner mentioned above may well promote the condensation.

The amount of the catalyst, if used, may be suitably from about 0.0001 to about 10% by weight, preferably from 0.0005 to 3% by weight, more preferably from 0.0005 to 1% by weight, relative to the total amount of the polymer (a-1) and the polysiloxane (a-2) being reacted.

In order to smoothly carry out the condensation of the polymer (a-1) and the polysiloxane (a-2), it is desirable to promote the hydrolysis of the hydrolyzable silyl group existing in the polymer (a-1) and the silicon atom-bonded hydrolyzable group existing in the polysiloxane (a-2). Accordingly, it is especially desirable to conduct the condensation in the presence of water.

To obtain the above-mentioned resin (A) through the condensation conducted in the presence of water, water is added to a mixture of the polymer (a-1) and the polysiloxane (a-2). Then the hydrolyzable silyl group existing in the polymer (a-1) and, as the case may be, also the silicon atom-bonded hydrolyzable group existing in the polysiloxane (a-2) are both hydrolyzed, and thereafter the polymer (a-1) and the polysiloxane (a-2) are condensed. However, addition of water to the mixture may be omitted, when water remains in the polysiloxane (a-2) prepared in the manner mentioned above. Precisely, the hydrolyzable silyl group existing in the polymer (a-1) and, as the case may be, also the silicon atom-bonded hydrolyzable group existing in the polysiloxane (a-2) are both hydrolyzed with water that remains in the polysiloxane (a-2), and thereafter the polymer (a-1) and the polysiloxane (a-2) are condensed.

The amount of water to be added to the condensation reaction system is not specifically defined but may be determined freely. Needless-to-say, the catalyst and water can be added to the reaction system all at a time or intermittently in portions, or, if desired, the catalyst and water can also be added thereto either as a mixture thereof or separately from each other.

The reaction temperature for this condensation is suitably from 0° C. to 150° C. or so, but preferably from 20° C. to 100° C. The reaction pressure is not specifically defined, and the condensation may be conducted at ordinary pressure, or under pressure or even under reduced pressure.

The by-products produced by the condensation, such as alcohols and water, remain in the resin (A). If such by-products have some negative influences on the stability of the curable resin composition to be finally obtained herein, they can be removed from the reaction mixture through any conventional methods, such as distillation or the like. If, however, they have no influence thereon, needless-to-say, they may well remain in the reaction mixture with no problem.

Organic solvents may be or may not be used in this condensation. However, in order to make it easy to stir the reaction mixture, it is desirable to use some organic solvents, such as those mentioned above as the organic solvents usable in the preparation of the polysiloxane (a-2).

Needless-to-say, the organic solvents, if needed, can be used herein either singly or as combined.

If the condensation is conducted herein in the presence of an organic solvent, the concentration of the polymer (a-1) and the polysiloxane (a-2) in the solvent is desirably about 5% by weight or more, in terms of the total amount of the two reactants.

The functional groups contained in the resin (A) thus prepared are the silanol group, and, as the case may be, the silicon atom-bonded hydrolyzable group, which are derived from the polymer (a-1) and the polysiloxane (a-2) used, and, in addition to these, at least one functional group derived from the polymer (a-1), such as at least one selected from the group consisting of a hydroxyl group, a blocked hydroxyl group, a carboxyl group, a blocked carboxyl group, a carboxylic acid anhydride group, an amino group, a cyclo-carbonate group, an epoxy group, a primary amido bond, a secondary amido bond, a carbamate group and the functional group of formula (I) mentioned above.

When the polymer (a-1) having any of a blocked hydroxyl group, a blocked carboxyl group and a carboxylic acid anhydride group is used to prepare the resin (A), at least a part of these functional groups in the polymer (a-1) may be converted into a free hydroxyl group or carboxyl group through hydrolysis, acid catalyzed decomposition or alcoholysis during the condensation of the polymer (a-1) and the polysiloxane (a-2).

Depending on the type of the blocked functional group existing in the polymer (a-1) and also on the condition taken for the condensation of the polymer (a-1) and the polysiloxane (a-2), the blocked functional group may be completely converted into the corresponding free functional group.

The compound (B) which is used as one component in the curable resin composition of the present invention is any known compound having, in the molecule, at least one functional group capable of reacting with any of the functional groups existing in the resin (A). Typical but not limited examples of the functional group contained in the compound (B) include an isocyanate group, a blocked isocyanate group, a hydroxyl group, a blocked hydroxyl group, a carboxyl group, a blocked carboxyl group, a carboxylic acid anhydride group, an amino group, a cyclocarbonate group, a linear carbonate group, an epoxy group, a primary amido bond, a secondary amido bond, a carbamate group, an oxazoline group, an N-hydroxymethylamino group, an N-alkoxymethylamino group, a carbonyl group, an acetoacetyl group, a phosphoric acid group, a sulfonic acid group, a silanol group, a hydrolyzable group bonded to a silicon atom, and also a functional group to be represented by a structural formula (II):

—(CO)—NH—CH(OR$_1$)—COOR$_2$ (II)

wherein R$_1$ and R$_2$ may be the same or different and each represents a hydrogen atom, an alkyl group having from 1 to 8 carbon atoms, or an aryl group.

The functional group to be introduced in the compound (B) shall be suitably selected, depending on the type of the functional group(s) existing in the resin (A). Typical but not limited examples of the combination of such functional groups include carboxyl group-epoxy group, carboxyl group-cyclocarbonate group, hydroxyl group-N-hydroxymethylamino group, and hydroxyl group-isocyanate group.

Depending on the type of the functional group(s) existing in the resin (A), the compound (B) may have two or more functional groups which may be selected from those mentioned above. As the compound (B), employable herein is any of compounds having a relatively low molecular weight and even various resins Typical but not limited examples of the resins include various vinyl polymers, such as acrylic resins and fluorine-containing resins, and also polyester resins, alkyd resins, polyurethane resins, and epoxy resins. When the compound (B) having two or more functional groups, such as those selected from the functional groups mentioned above is to be used, a vinyl polymer is conveniently used as the compound (B).

Typical but not limited examples of the compound (B) include polyisocyanate compounds; blocked polyisocyanate compounds; polyepoxy compounds; polycyclocarbonate compounds; amino resins; primary or secondary amido bond-containing compounds; polycarboxyl compounds; polyhydroxyl compounds; blocked hydroxyl group-containing compounds; polyamine compounds; compounds having, in one molecule, both an epoxy group or an amino group and a hydrolyzable group bonded to a silicon atom; compounds having at least two carboxylic acid anhydride groups; polyoxazoline compounds; and polysiloxanes having a silanol group and/or a hydrolyzable group bonded to a silicon atom. Needless-to-say, these compounds can be used either singly or as combined.

Of these, especially preferred are polyisocyanate compounds, blocked polyisocyanate compounds, polyepoxy compounds, polycyclocarbonate compounds, amino resins, primary or secondary amido bond-containing compounds, polycarboxyl compounds, polyhydroxyl compounds, and compounds having, in one molecule, both an epoxy group and a hydrolyzable group bonded to a silicon atom.

Typical but not limited examples of the polyisocyanate compounds include;
various aromatic diisocyanates such as tolylene diisocyanate and diphenylmethane-4,4'-diisocyanate; various aralkyl diisocyanates such as meta-xylylene diisocyanate, and α,α,α',α'-tetramethyl-meta-xylylene diusocyanate;

various aliphatic or alicyclic diisocyanates, such as hexamethylene diisocyanate, lysine diisocyanate, 1,3-bisisocyanatomethylcyclohexane, 2-methyl-1,3-diisocyanatocyclohexane, 2-methyl-1,5-diisocyanatocyclohexane, and isophorone diisocyanate;

prepolymers with isocyanate groups obtained by addition reaction of various polyisocyanates such as those mentioned above and polyhydric alcohols; various prepolymers with isocyanurate rings obtained by cyclizing and trimerizing various polyisocyanates such as those mentioned above;

various polyisocyanates with a biuret structure obtained by reacting various polyisocyanates such as those mentioned above with water; various homopolymers of vinyl monomers with isocyanate group(s) such as 2-isocyanatoethyl (meth)acrylate, 3-isopropenyl-α,α,-dimethylbenzyl isocyanate or (meth)acryloyl isocyanate; and various vinyl copolymers, such as isocyanate group-containing acrylic copolymers, vinyl ester copolymers and fluoroolefin copolymers, which are obtained by copolymerizing isocyanate group-containing vinyl monomers such as those mentioned above with other vinyl comonomers capable of copolymerizing with the vinyl monomers, such as (meth)acrylic comonomers, vinyl ester comonomers, vinyl ether comonomers, aromatic vinyl comonomers or fluoroolefin comonomers.

Of these polyisocyanates, especially preferred are aliphatic or alicyclic diisocyanate compounds and also various prepolymers and isocyanate group-containing vinyl polymers derived from such diisocyanate compounds, in view of their weather resistance.

Typical but not limited examples of the blocked polyisocyanate compounds include compounds that generate polyisocyanates under heating, as exemplified by various blocked polyisocyanate compounds obtained by blocking various polyisocyanate compounds such as those mentioned above with various blocking agents which will be mentioned hereinafter, and various compounds with an urethodione structure formed by dimerizing isocyanate groups.

Typical but not limited examples of the blocking agents to be used for preparing blocked (poly)isocyanate compounds include;
various carbinol group-containing compounds, such as methanol, ethanol, benzyl alcohol and lactates;
various phenolic hydroxyl group-containing compounds, such as phenol, salicylates and cresol; various amides such as ε-caprolactam, 2-pyrrolidone and acetanilide;
oximes such as acetone oxime and methyl ethyl ketoxime; and various active methylene compounds, such as methyl acetoacetate, ethyl acetoacetate and acetylacetone.

Typical but not limited examples of the above-mentioned polyepoxy compounds include;

various polyglycidyl ethers of aliphatic or alicyclic polyols such as ethylene glycol, hexanediol, neopentyl glycol, trimethylolpropane, trimethylolethane, glycerin, pentaerythritol, sorbitol or hydrogenated bisphenol A;

various polyglycidyl ethers of aromatic diols such as hydroquinone, catechol, resorcinol, bisphenol A, bisphenol S or bisphenol F; various diglycidyl ethers of aromatic diol derivatives such as the adducts of ethylene oxide or propylene oxide with aromatic diols such as those mentioned above;

various polyglycidyl ethers of polyether polyols such as polyethylene glycol, polypropylene glycol or polytetraethylene glycol; polyglycidyl ethers of tris(2-hydroxyethyl) isocyanurate; various polyglycidyl esters of aliphatic or aromatic polycarboxylic acids such as adipic acid, butane-tetracarboxylic acid, propane-tricarboxylic acid, phthalic acid, terephthalic acid or trimellitic acid;

various bisepoxides of various dienes such as butadiene, hexadiene, octadiene, dodecadiene, cyclooctadiene, α-pinene or vinylcyclohexene; various alicyclic polyepoxy compounds, such as bis(3,4-epoxycyclohexylmethyl) adipate and 3,4-epoxycyclohexylmethyl 3,4-epoxycyclohexylcarboxylate; various epoxy compounds of various diene polymers such as polybutadiene or polyisoprene; and various homopolymers of various epoxy group-containing vinyl monomers such as those mentioned above; and also various vinyl copolymers such as epoxy group-containing acrylic copolymers, vinyl ester copolymers and fluoroolefin copolymers, which are obtained by copolymerizing epoxy group-containing vinyl monomers such as those mentioned above with other comonomers capable of copolymerizing with the vinyl monomers, such as (meth)acrylic comonomers, vinyl ester comonomers, vinyl ether comonomers, aromatic vinyl comonomers or fluoroolefin comonomers.

Typical but not limited examples of the polycyclocarbonate compounds include 5-membered cyclocarbonate group-containing polycyclocarbonate compounds obtained by reacting various polyepoxy compounds such as those mentioned above with carbon dioxide in the presence of a catalyst; various homopolymers of various cyclocarbonate group-containing vinyl monomers such as those mentioned above; and also various vinyl copolymers such as cyclocarbonate group-containing acrylic copolymers, vinyl ester copolymers and fluoroolefin copolymers, which are obtained by copolymerizing cyclocarbonate group-containing vinyl monomers with other comonomers capable of copolymerizing with the vinyl monomers, such as (meth)acrylic comonomers, vinyl ester comonomers, vinyl ether comonomers, aromatic vinyl comonomers or fluoroolefin vinyl comonomers.

Typical but not limited examples of the amino resins include various alkylol group-containing amino resins obtained by reacting various amino group-containing compounds, such as melamine, benzoguanamine, acetoguanamine, urea or glycouril, with various aldehyde compounds such as formaldehyde or acetaldehyde (or with aldehyde precursors); and also alkoxyalkyl group-containing amino resins obtained by reacting such alkylol group-containing amino resins with various lower alcohols such as methanol, ethanol, n-butanol or i-butanol.

Typical but not limited examples of the primary or secondary amido bond-containing compounds include homopolymers of various primary or secondary amido bond-containing vinyl monomers such as those exemplified above as the monomers employable in the preparation of the primary or secondary amido bond-containing polymer (a-1); and also various vinyl copolymers, such as various primary or secondary amido bond-containing acrylic copolymers, vinyl ester copolymers and fluoroolefin copolymers, which are obtained by copolymerizing primary or secondary amido bond-containing vinyl monomers such as those mentioned above with other comonomers capable of copolymerizing with the vinyl monomers, such as (meth)acrylic comonomers, vinyl ester comonomers, vinyl ether comonomers, aromatic vinyl comonomers or fluoroolefin comonomers.

Typical but not limited examples of the polycarboxyl compounds include low-molecular weight compounds, such as oxalic acid, malonic acid, succinic acid, glutaric acid, adipic acid, sebacic acid, azelaic acid, phthalic acid, terephthalic acid, isophthalic acid, tartronic acid, malic acid, tartaric acid and citric acid; homopolymers of various carboxyl group-containing vinyl monomers such as those exemplified above as the monomers employable in the preparation of the carboxyl group-containing polymer (a-1); and also various vinyl copolymers, such as various carboxyl group-containing acrylic copolymers, vinyl ester copolymers and fluoroolefin copolymers, which are obtained by copolymerizing carboxyl group-containing vinyl monomers with other comonomers capable of copolymerizing with the vinyl monomers, such as (meth)acrylic comonomers, vinyl ester comonomers, vinyl ether comonomers, aromatic vinyl comonomers or fluoroolefin comonomers.

Typical but not limited examples of the polyhydroxy compounds include low-molecular weight compounds, such as ethylene glycol, propylene glycol, butylene glycol and glycerin; polyethylene glycol, polypropylene glycol; and also homopolymers of various hydroxyl group-containing vinyl monomers such as those exemplified above as the monomers employable in the preparation of the hydroxyl group-containing polymer (a-1); and various vinyl copolymers, such as various hydroxyl group-containing acrylic copolymers, vinyl ester copolymers and fluoroolefin copolymers, which are obtained by copolymerizing hydroxyl group-containing vinyl monomers with other comonomers capable of copolymerizing with the vinyl monomers, such as (meth)acrylic comonomers, vinyl ester comonomers, vinyl ether comonomers, aromatic vinyl comonomers or fluoroolefin in comonomers.

Typical but not limited examples of the compounds having, in one molecule, both an epoxy group and a hydrolyzable group bonded to a silicon atom include;

3-glycidoxypropyltrimethoxysilane, 3-glycidoxypropylmethyldimethoxysilane, 3-glycidoxypropyltriethoxysilane, and 3-glycidoxypropylmethyldiethoxysilane;

"EGM-202" (trade name of cyclic polysiloxane having both methoxy group bonded to silicon atom and 3-glycidoxypropyl group; produced by Toray Dow Corning Silicone Co.);

various copolymers of various epoxy group-containing monomers such as those mentioned above and various hydrolyzable silyl group-containing vinyl monomers such as those mentioned above; and various vinyl copolymers, such as various acrylic copolymers, vinyl ester copolymers and fluoroolefin copolymers having both an epoxy group and a hydrolyzable silyl group, which are obtained by copolymerizing both such epoxy group-containing monomers and hydrolyzable silyl group-containing monomers with other comonomers capable of copolymerizing with these monomers, such as (meth)acrylic comonomers, vinyl ester comonomers, vinyl ether comonomers, aromatic vinyl comonomers or fluoroolefin comonomers.

To prepare the curable resin composition of the present invention that comprises the above-mentioned resin (A) and the above-mentioned, so-called reactive functional group-containing compound (B), the compound (B) is, if it is a polyisocyanate compound or a blocked polyisocyanate compound blended with the resin (A) in such a manner that the amount of the isocyanate group existing in the compound (B) is from about 0.1 to about 10 equivalents, preferably from 0.3 to 5 equivalents, more preferably from 0.5 to 2 equivalents, per equivalent of the functional group existing in the resin (A) and capable of reacting with the isocyanate group or blocked isocyanate group in the compound (B).

If the compound (B) is a polyepoxy compound, or a polycyclocarbonate compound, or a compound having, in one molecule, both an epoxy group and a hydrolyzable group bonded to a silicon atom, this is blended with the resin (A) in such a manner that the total amount of the epoxy group and/or the cyclocarbonate group existing in the compound (B) is from about 0.2 to about 5.0 equivalents, preferably from 0.5 to 3.0 equivalents, more preferably from 0.7 to 2 equivalents, per equivalent of the functional group existing in the resin (A) and capable of reacting with the epoxy group or the cyclocarbonate group in the compound (B).

If the compound (B) is an amino resin, this is blended with the resin (A) in such a manner that the solid of the compound (B) is from about 5 to about 200 parts by weight, preferably from 10 to 150 parts by weight, more preferably from 15 to 100 parts by weight, per 100 parts by weight of the solid of the resin (A).

If the compound (B) is a primary or secondary amido bond-containing compound, this is blended with the resin (A) in such a manner that the amount of the primary or secondary amido bond existing in the compound (B) is from about 0.2 to about 5.0 equivalents, preferably from 0.5 to 3.0 equivalents, more preferably from 0.7 to 2 equivalents, per equivalent of the functional group existing in the resin (A) and capable of reacting with the primary or secondary amido bond in the compound (B).

If the compound (B) is a polycarboxyl compound, this is blended with the resin (A) in such a manner that the amount of the carboxyl group existing in the compound (B) is from about 0.2 to about 5.0 equivalents, preferably from 0.5 to 3.0 equivalents, more preferably from 0.7 to 2 equivalents, per equivalent of the functional group existing in the resin (A) and capable of reacting with the carboxyl group in the compound (B).

If the compound (B) is a polyhydroxyl compound, this is blended with the resin (A) in such a manner that the amount of the hydroxyl group existing in the compound (B) is from about 0.2 to about 5.0 equivalents, preferably from 0.5 to 3.0 equivalents, more preferably from 0.7 to 2 equivalents, per equivalent of the functional group existing in the resin (A) and capable of reacting with the hydroxyl group in the compound (B).

Even if no curing catalyst is added, the curable resin composition of the present invention thus prepared in the manner mentioned above can have curability of a practically-acceptable level, provided that curing conditions are suitably determined depending on the combination of the functional groups existing in the resin (A) and the functional groups existing in the compound (B).

However, in order to improve the curability of the composition at low temperatures and also to shorten the curing time, a curing catalyst (C) can be added to the composition.

Typical but not limited examples of the curing catalyst (C) include;

various catalysts such as those mentioned above as the catalysts employable in preparing the polysiloxane (a-2), and, in addition to these, various organic phosphines such as trimethylphosphine, triethylphosphine and triphenylphosphine;

and also various phosphonium salts, such as tetramethylphosphonium salts, tetraethylphosphonium salts, tetrapropylphosphonium salts, tetrabutylphosphonium salts, trimethyl(2-hydroxypropyl)phosphonium salts, triphenylphosphonium salts and benzylphosphonium salts, with various counter anions, such as chloride, bromide, carboxylate or hydroxide anion.

The amount of the catalyst (C), if added to the composition, is suitably from about 0.0001 to about 10% by weight, preferably from 0.001 to 5% by weight, more preferably from 0.002 to 3% by weight, relative to the total amount of the solids of the resin (A) and the compound (B) in the composition.

In addition to the curing catalysts mentioned above, also employable, as effective catalysts, are various polymers having such catalitically active groups or residues as contained in the above-mentioned curing catalysts. The curable resin composition of the present invention that can be prepared in the manner as mentioned above may further contain, if desired, various known additives, such as flow-controlling agents, pigments, dyes, leveling agents, rheology-controlling agents, ultraviolet absorbers, antioxidants and plasticizers, and can be applied to various uses.

The thus-obtained, curable resin composition of the present invention is dried at-room temperature for from 3 to 10 days or so, or is baked at from 80° to 250° C. or so for from about 30 seconds to about 2 hours, to give a cured product with high practicability.

Since the cured product obtained from the curable resin composition of the present invention has extremely high durability, acid resistance and scratch resistance, the composition can be applied to various broad uses such as top-coating compositions for cars, coating compositions for exterior walls of constructions, heat-resisting coating compositions, adhesives, ink compositions, compositions to be infiltrated into fibers and paper, and surface-treating compositions.

Typical but not limited examples of substrates, to which the curable resin composition of the present invention is applied especially as a coating composition, include various metal materials or metal products such as aluminium, stainless steel, chromium-plated steel, galvanized steel, or tin plates; tiles; glass; and also other various inorganic construction materials. More concrete examples are car bodies, car parts, two-wheeled vehicles and their parts; and also various construction materials such as gates and fences; interior and exterior construction materials, such as aluminium sashes; as well as various iron or nonferrous metal materials or products such as aluminium wheels.

EXAMPLES OF THE INVENTION

Now, the present invention is described in more detail hereinafter with reference to the following Reference Examples, Examples and Comparative Examples, which, however, are not intended to restrict the scope of the present invention. In the following, parts and % are all by weight, unless otherwise specifically indicated.

REFERENCE EXAMPLE 1
Preparation of Vinyl Monomer with Group of Formula (I)

77.5 parts of xylene, 77.5 parts of n-butyl acetate, 155 parts of 2-isocyanatoethyl methacrylate and 0.268 parts of hydroquinone monomethyl ether were put into a reaction vessels equipped with a thermometer, a reflux condenser, a stirrer, a dropping funnel and a nitrogen-introducing tube, and the mixture was heated up to 80° C. while introducing nitrogen gas thereinto.

Then, a mixture comprising 56.5 parts of xylene, 56.6 parts of n-butyl acetate and 113 parts of ε-caprolactam was dropwise added thereto at the same temperature over a period of 4 hours. Still after the addition, the mixture was further stirred for 5 hours at the same temperature, to give the intended vinyl monomer (1-1) having the group of the above-mentioned structural formula (I) and having a non-volatile content of 50%.

REFERENCE EXAMPLE 2
Preparation of Polymer (a-1)

350 parts of xylene, 150 parts of n-butanol and 45 parts of methyl orthoformate were put into a reaction vessel equipped with a thermometer, a reflux condenser, a stirrer, a dropping funnel and a nitrogen-introducing tube, and the mixture was heated up to 80° C. while introducing nitrogen gas thereinto.

Then, a mixture comprising 400 parts of methyl methacrylate, 362 parts of n-butyl methacrylate, 178 parts of n-butyl acrylate, 30 parts of γ-methacryloyloxypropyltrimethoxysilane, 30 parts of acrylic acid, 249 parts of xylene, 107 parts of n-butanol, and 50 parts of tert-butyl peroxy-2-ethylhexanoate was dropwise added thereto at the same temperature over a period of 4 hours.

Still after the addition, the mixture was further stirred at the same temperature for 16 hours, to give a solution of a polymer having both a carboxyl group and a trimethoxysilyl group, having a non-volatile content of 54.3% and having a number average molecular weight of 11,000. This is hereinafter referred to as (a-1-1).

REFERENCE EXAMPLES 3 to 14
Preparation of Polymers (a-1)

Polymers (a-1) having the properties shown in Table 1 below were prepared in the same manner as in Reference Example 2, except that the types of the monomers and the solvents to be used and also their amounts were varied to those shown in Table 1. The polymers obtained herein are referred to as (a-1-2) to (a-1-13) in order, as in Table 1.

TABLE 1 (1-1)

|  | Reference Example 3 | Reference Example 4 | Reference Example 5 | Reference Example 6 |
|---|---|---|---|---|
| Solvents initially charged |  |  |  |  |
| Xylene | 382 | 350 | 250 | 315 |
| n-Butanol | 163 | 150 |  |  |
| n-butyl Acetate | 250 | 315 |  |  |
| Methyl Orthoformate |  | 45 |  |  |
| Monomers |  |  |  |  |
| Styrene |  | 200 | 500 | 300 |
| Methyl Methacrylate | 400 |  |  |  |

TABLE 1 (1-1)-continued

|  | Reference Example 3 | Reference Example 4 | Reference Example 5 | Reference Example 6 |
|---|---|---|---|---|
| n-Butyl Methacrylate | 360 | 360 | 123 | 334 |
| n-Butyl Acrylate | 180 |  | 114 | 143 |
| 2-EHMA |  | 80 |  |  |
| 2-EHA |  | 100 |  |  |
| Acrylic Acid |  | 30 | 3 | 3 |
| 1-EEMA | 55 |  |  |  |
| β-HEMA |  | 200 | 230 |  |
| β-TMSEMA |  |  |  | 264 |
| γ-MPTMS | 30 | 30 | 30 | 50 |
| Solvents added |  |  |  |  |
| Xylene | 249 | 249 | 178 | 178 |
| n-Butanol | 107 | 107 |  |  |
| n-Butyl Acetate |  |  | 178 | 178 |
| Initiator |  |  |  |  |
| TBPOEH | 50 | 50 | 50 | 50 |

Notes to Table 1:
The numerals indicating the amounts of the raw materials used are all parts by weight.
2-EHMA: 2-ethylhexyl methacrylate
2-EHA: 2-ethylhexyl acrylate
1-EEMA: 1-ethoxyethyl methacrylate
β-HEMA: β-hydroxyethyl methacrylate
β-TMSEMA: β-trimethylsiloxyethyl methacrylate
γ-MPTMS: γ-methacryloyloxypropyltrimethoxysilane
TBPOEH: tert-butyl peroxy-2-ethylhexanoate

TABLE 1 (1-2)

|  | Reference Example 3 | Reference Example 4 | Reference Example 5 | Reference Example 6 |
|---|---|---|---|---|
| Properties of Resin |  |  |  |  |
| Non-volatile Content (%) | 55.2 | 53.8 | 54.8 | 54.2 |
| Number Average Molecular Weight | 10,000 | 10,800 | 10,000 | 9,500 |
| Name of Polymer | a-1-2 | a-1-3 | a-1-4 | a-1-5 |

TABLE 1 (2-1)

|  | Reference Example 7 | Reference Example 8 | Reference Example 9 | Reference Example 10 |
|---|---|---|---|---|
| Solvents Initially charged Solvents |  |  |  |  |
| Xylene | 350 | 350 | 350 | 382 |
| n-Butanol |  | 150 | 150 | 163 |
| n-Butyl Acetate | 150 |  |  |  |
| Methyl Orthoformate | 45 | 45 | 45 |  |
| Monomers |  |  |  |  |
| Styrene | 100 |  | 150 |  |
| Methyl Methacrylate | 400 | 400 |  | 300 |
| n-Butyl Methacrylate | 270 | 352 | 189 | 278 |
| n-Butyl Acrylate | 150 | 178 |  | 157 |

TABLE 1 (2-1)-continued

|  | Reference Example 7 | Reference Example 8 | Reference Example 9 | Reference Example 10 |
|---|---|---|---|---|
| 2-EHMA |  |  | 323 |  |
| Acrylic Acid |  | 30 |  |  |
| Methacrylic Acid |  |  | 58 |  |
| β-HEMA |  |  |  | 50 |
| Maleic Anhydride | 50 |  |  |  |
| DMAEMA |  | 10 |  |  |
| 2,3-CPMA |  |  | 250 |  |
| GMA |  |  |  | 185 |
| γ-MPTMS | 30 | 30 | 30 | 30 |

Notes to Table 1:
DMAEMA: dimethylaminoethyl methacrylate
2,3-CPMA: 2,3-carbonatopropyl methacrylate
GMA: glycidyl methacrylate

TABLE 1 (2-2)

|  | Reference Example 7 | Reference Example 8 | Reference Example 9 | Reference Example 10 |
|---|---|---|---|---|
| Solvents added |  |  |  |  |
| Xylene | 249 | 249 | 249 | 249 |
| n-Butanol |  | 107 | 107 | 107 |
| n-Butyl Acetate | 107 |  |  |  |
| Initiator |  |  |  |  |
| TBPOEH | 50 | 50 | 50 | 50 |

TABLE 1 (2-3)

|  | Reference Example 7 | Reference Example 8 | Reference Example 9 | Reference Example 10 |
|---|---|---|---|---|
| Properties of Resin |  |  |  |  |
| Non-votatile Content (%) | 53.4 | 54.1 | 53.0 | 53.2 |
| Number Average Molecular Weight | 11,700 | 11,200 | 11,000 | 10,000 |
| Name of Polymer | a-1-6 | a-1-7 | a-1-8 | a-1-9 |

TABLE 1 (3-1)

|  | Reference Example 11 | Reference Example 12 | Reference Example 13 | Reference Example 14 |
|---|---|---|---|---|
| Solvents initially charged |  |  |  |  |
| Xylene | 382 | 350 | 350 | 148 |
| n-Butanol | 163 | 350 | 210 |  |
| n-Butyl Acetate |  |  |  | 148 |
| Methyl Ethyl Ketone |  |  | 140 |  |
| Monomers |  |  |  |  |
| Styrene |  | 100 | 100 |  |
| Methyl Methacrylate | 400 | 248 | 200 | 300 |
| n-Butyl Methacrylate | 227 |  | 160 | 243 |
| n-Butyl Acrylate | 225 | 202 | 175 | 171 |
| Acrylic Acid |  |  |  | 3 |
| Acrylamide | 118 |  |  |  |
| N-BMMAM |  | 420 |  |  |
| 2-N-MCEMA (1-1) |  |  | 335 |  |
| γ-MPTMS | 30 | 30 | 30 | 806 50 |

Notes to Table 1:
N-BMMAM: N-n-butoxymethylmethacrylamide
2-N-MCEMA: 2-(N-methylcarbamoyloxy)ethyl methacrylate
ABMBN: 2,2'-azobis-(2-methylbutyronitrile)

TABLE 1 (3-2)

|  | Reference Example 11 | Reference Example 12 | Reference Example 13 | Reference Example 14 |
|---|---|---|---|---|
| Solvents added |  |  |  |  |
| Xylene | 249 | 150 | 150 | 178 |
| n-Butanol | 107 | 150 | 90 |  |
| n-Butyl Acetate |  |  |  | 178 |
| Methyl Ethyl Ketone |  |  | 60 |  |
| Initiator |  |  |  |  |
| ABMBN | 40 | 40 | 40 | 40 |

TABLE 1 (3-3)

|  | Reference Example 11 | Reference Example 12 | Reference Example 13 | Reference Example 14 |
|---|---|---|---|---|
| Properties of Resin |  |  |  |  |
| Non-volatile Content (%) | 54.0 | 53.2 | 53.0 | 54.0 |
| Number Average Molecular Weight | 12,000 | 13,000 | 12,900 | 13,000 |
| Name of Polymer | a-1-10 | a-1-11 | a-1-12 | a-1-13 |

REFERENCE EXAMPLE 15
Preparation of Polymer (a-1)

373 parts of 2,2-dimethyl-3-hydroxypropyl 2,2-dimethyl-3-hydroxypropionate, 44 parts of 2,2-dimethylolpropionic acid, 417 parts of xylene and 0.44 parts of dibutyl tin dioctoate were put into a reactin vessel equipped with a thermometer, a reflux condenser, a stirrer, a dropping funnel and a nitrogen-introducing tube, and the mixture was heated up to 80° C. while introducing nitrogen gas thereinto.

Then, a mixture comprising 519 parts of isophorone diisocyanate and 519 parts of xylene was dropwise added thereto at the same temperature over a period of 1 hour. Still after the addition, the mixture was further stirred at the same temperature for 4 hours, and at this point the isocyanate concentration in the mixture was found to be nearly the same as the theoretical value.

After this, a mixture comprising 64 parts of γ-aminopropyltrimethoxysilane and 64 parts of xylene was dropwise added thereto at the same temperature over a period of 10 minutes. Still after the addition, the mixture was further stirred at the same temperature for 4 hours. After the isocyanate group was confirmed to have disappeared by IR analysis, 50 parts of xylene and 450 parts of n-butanol were added to give a solution of a polymer having both a carboxyl group and a trimethoxysilyl group, having a non-volatile content of 43.3% and having a number average molecular weight of 5,500. This is hereinafter referred to as (a-1-14).

REFERENCE EXAMPLES 16 and 17
Preparation of Control Vinyl Polymers

Solutions of control vinyl polymers having the properties as shown in Table 1 below were prepared in the same manner as in Reference Example 2, except that the types of the monomers and the solvents to be used and also their amounts were varied to those shown in Table 1. The polymers obtained are referred to as Control Resin 1 and Control Resin 2, as in Table 1.

TABLE 1 (4-1)

|  | Reference Example 16 | Reference Example 17 |
|---|---|---|
| Solvents initially charged |  |  |
| Xylene | 500 | 500 |
| n-Butanol | 300 |  |
| n-Butyl Acetate |  | 300 |
| Monomers |  |  |
| Styrene | 200 |  |
| Methyl Methacrylate |  | 400 |
| n-Butyl Methacrylate | 390 | 130 |
| n-Butyl Acrylate |  | 235 |
| 2-EHMA | 80 |  |
| 2-EHA | 100 |  |
| Acrylic Acid | 30 | 3 |
| β-HEMA |  | 232 |
| Solvent |  |  |
| Xylene | 200 | 200 |
| Initiator |  |  |
| TBPOEH | 50 | 50 |

TABLE 1 (4-2)

|  | Reference Example 16 | Reference Example 17 |
|---|---|---|
| Properties of resin |  |  |
| Non-volatile Content (%) | 53.4 | 52.2 |
| Number Average Molecular Weight | 11,000 | 10,500 |
| Name of Polymer | Control Resin 1 | Control Resin 2 |

REFERENCE EXAMPLE 18
Preparation of Resin (A)

915 parts of methyltriethoxysilane, 64 parts of phenyltrimethoxysilane, 58 parts of dimethyldimethoxysilane, 106 parts of γ-glycidoxypropylmethyldimethoxysilane, 406 parts of xylene and 174 parts of n-butanol were put into a reaction vessel equipped with a thermometer, a reflux condenser, a stirrer and a dropping funnel, and the mixture was heated up to 80° C.

Then, 0.031 parts of "AP-3" (trade name of isopropyl acid phosphate, produced by Daihachi Chemical Industry Co.) and 347 parts of deionized water were dropwise added thereto at the same temperature over a period of 5 minutes. Still after the addition, the mixture was further stirred at the same temperature for 4 hours, and the hydrolysis of the methyltriethoxysilane, phenyltrimethoxysilane, dimeth-yldimethoxysilane and γ-glycidoxypropylmethyldimethoxysilane was confirmed by its $^1$H-NMR analysis.

After this, 927 parts of Polymer (a-1-1) was added thereto and stirred for 4 hours at the same temperature. After having confirmed the completion of hydrolysis of the trimethoxysilane part in the polymer by its $^1$H-NMR analysis, the reaction mixture was subjected to distillation under reduced pressure to remove the by-products, ethanol and others. Thus was obtained a solution of a resin having a non-volatile content of 50.2%. This is hereinafter referred to as (A-1).

REFERENCE EXAMPLES 19 to 33
Preparation of Resins (A)

Resins (A) having the properties as shown in Table 2 below were prepared in the same manner as in Reference Example 18, except that the type of the silicon compound to be used for producing the polysiloxane (a-2) and the amount of the compound, the type of the polymer (a-1) and its amount, and also the amount of the catalyst to be used herein were varied to those shown in Table 2. The resins obtained are referred to as (A-2) to (A-16) in order, as in

TABLE 2 (1)

|  | Reference Example 19 | Reference Example 20 | Reference Example 21 |
|---|---|---|---|
| Xylene | 416 | 401 | 279 |
| n-Butanol | 178 | 177 | 119 |
| MTES | 896 | 946 | 570 |
| PTMS | 67 | 66 | 40 |
| DMDMS | 121 | 80 | 48 |
| γ-GyPrMDMS |  | 73 | 44 |
| γ-GyPrTMS | 79 |  |  |
| Water | 363 | 369 | 216 |
| "AP-3" | 0.032 | 0.032 | 0.019 |
| Polymer (a-1-2) | 905 |  |  |
| Polymer (a-1-3) |  | 926 | 1303 |
| Non-volatile Content (%) | 50.1 | 51.1 | 50.7 |
| Name of Polymer | A-2 | A-3 | A-4 |

Notes to Table 2:
The numerals indicating the amounts of the raw materials used are all parts by weight.
MTES: methyltriethoxysilane
PTMS: phenyltrimethoxysilane
DMDMS: dimethyldimethoxysilane
γ-GyPrMDMS: γ-glycidoxypropylmethyldimethoxysilane
γ-GyPrTMS: γ-glycidoxypropyltrimethoxysilane

TABLE 2 (2)

|  | Reference Example 22 | Reference Example 23 | Reference Example 24 |
|---|---|---|---|
| Xylene | 160 | 296 | 286 |
| n-Butanol | 69 |  |  |
| n-Butyl Acetate |  | 296 | 286 |
| MTES | 203 | 509 | 1208 |
| MTMS |  | 389 |  |
| PTMS | 14 | 71 | 71 |
| DMDMS | 17 | 129 |  |
| γ-GyPrMDMS | 16 |  |  |
| Water | 77 | 386 | 386 |
| "AP-3" | 0.007 | 0.035 | 0.035 |
| Polymer (a-1-3) | 1671 |  |  |
| Polymer (a-1-4) |  | 905 |  |
| Polymer (a-1-5) |  |  | 934 |
| Non-volatile Content (%) | 50.6 | 50.3 | 50.5 |
| Name of Polymer | A-5 | A-6 | A-7 |

Notes to Table 2:
MTMS: methyltrimethoxysilane

TABLE 2 (3)

|  | Reference Example 25 | Reference Example 26 | Reference Example 27 |
|---|---|---|---|
| Xylene | 393 | 403 | 395 |
| n-Butanol |  | 173 | 169 |
| n-Butyl Acetate | 168 |  |  |
| MTES | 811 | 458 | 890 |
| PTMS | 301 | 501 | 71 |
| DMDMS |  |  | 214 |
| Water | 328 | 278 | 386 |
| "AP-3" | 0.029 | 0.025 | 0.035 |
| Polymer (a-1-6) | 943 |  |  |
| Polymer (a-1-7) |  | 925 |  |
| Polymer (a-1-8) |  |  | 926 |
| Non-volatile Content (%) | 51.4 | 51.0 | 50.2 |
| Name of Polymer | A-8 | A-9 | A-10 |

TABLE 2 (4)

|  | Reference Example 28 | Reference Example 29 | Reference Example 30 |
|---|---|---|---|
| Xylene | 390 | 403 | 282 |
| n-Butanol | 167 | 173 | 282 |
| MTES | 966 | 534 | 1017 |
| PTMS | 134 | 297 | 71 |
| DMDMS | 81 | 180 | 129 |
| Water | 366 | 324 | 386 |
| "AP-3" | 0.033 | 0.029 | 0.035 |
| Polymer (a-1-9) | 945 |  |  |
| Polymer (a-1-10) |  | 923 |  |
| Polymer (a-1-11) |  |  | 932 |
| Non-volatile Content (%) | 50.7 | 50.2 | 51.3 |
| Name of Polymer | A-11 | A-12 | A-13 |

TABLE 2 (5)

|  | Reference Example 31 | Reference Example 32 | Reference Example 33 |
|---|---|---|---|
| Xylene | 278 | 285 | 250 |
| n-Butanol | 167 |  | 107 |
| n-Butyl Acetate |  | 285 |  |
| Methyl Ethyl Ketone | 111 |  |  |
| MTES | 906 | 687 | 509 |
| PTMS | 134 | 191 | 396 |
| DMDMS | 122 | 193 | 103 |
| Water | 366 | 347 | 309 |
| "AP-3" | 0.033 | 0.031 | 0.028 |
| Polymer (a-1-12) | 944 |  |  |
| Polymer (a-1-13) |  | 936 |  |
| Polymer (a-1-14) |  |  | 1135 |
| Non-volatile Content (%) | 50.1 | 51.2 | 50.0 |
| Name of Polymer | A-14 | A-15 | A-16 |

REFERENCE EXAMPLE 34
Preparation of Compound (B)

350 parts of xylene and 150 parts of n-butanol were put into a reaction vessel equipped with a thermometer, a reflux condenser, a stirrer, a dropping funnel and a nitrogen-introducing tube, and the mixture was heated up to 80° C. while introducing nitrogen gas thereinto.

Then, a mixture comprising 400 parts of methyl methacrylate, 200 parts of n-butyl methacrylate, 220 parts of n-butyl acrylate, 180 parts of 2-oxo-1,3-dioxolan-4-yl methacrylate, 280 parts of xylene, 120 parts of n-butanol and 50 parts of tert-butyl peroxy-2-ethylhexanoate was dropwise added thereto at the same temperature over a period of 4 hours.

Still after the addition, the mixture was further stirred for 16 hours at the same temperature, to give a solution of a polymer having a cyclocarbonate group, having a non-volatile content of 53.0% and having a number average molecular weight of 10,400. This is hereinafter referred to as (B-1).

REFERENCE EXAMPLES 35 to 37
Preparation of Compounds (B)

Polymers (B) having the properties as shown in Table 3 below were prepared in the same manner as in Reference Example 34, except that the types of the monomers and the solvents to be used and also their amounts were varied to those shown in Table 3. The compounds obtained herein are referred to as (B-2) to (B-4) in order, as in Table 3.

TABLE 3 (1)

|  | Reference Example 35 | Reference Example 36 | Reference Example 37 |
|---|---|---|---|
| Solvents initially charged |  |  |  |
| Xylene | 382 | 273 | 382 |
| n-Butanol | 163 | 273 | 163 |
| Monomers |  |  |  |
| Styrene | 150 | 100 | 100 |
| Methyl Methacrylate | 200 | 278 | 200 |
| n-Butyl Methacrylate | 396 |  | 390 |
| n-Butyl Acrylate | 185 | 202 | 78 |
| Methacrylic Acid | 69 |  |  |
| n-BMMAM |  | 420 |  |
| β-HEMA |  |  | 232 |
| Solvents added |  |  |  |
| Xylene | 249 | 178 | 249 |
| n-Butanol | 107 | 178 | 107 |
| Initiator |  |  |  |
| TBPOEH | 25 |  | 25 |
| ABMBN |  | 40 |  |

Notes to Table 3:
The numerals indicating the amounts of the raw materials used are all parts by weight. For the other abbreviations, refer to those in Table 1.

TABLE 3 (2)

|  | Reference Example 35 | Reference Example 36 | Reference Example 37 |
|---|---|---|---|
| Properties of Resin |  |  |  |
| Non-volatile Content (%) | 53.0 | 53.4 | 54.0 |
| Number Average Molecular Weight | 13,000 | 12,500 | 13,500 |
| Name of Polymer | B-2 | B-3 | B-4 |

EXAMPLES 1 to 16, COMPARATIVE EXAMPLES 1 and 2

First, a mixture comprising the polymer (A) and the pigment in the ratio shown in Table 4 was dispersed, using a sand mill, to prepare corresponding white bases. Next, the compound (B) and optionally the curing catalyst (C) were added in the ratio shown in Table 4 to each white base to prepare various white coating compositions each having a pigment weight concentration (PWC) of 35%.

Each of the thus-prepared coating compositions was applied onto a steel plate pre-coated with an electrodeposition coating and a primer-surfacer coating successively (produced by Nippon Route Service Co.), at a dry film thickness of about 40 μm, using an applicator, and then baked under the curing condition shown in Table 4. Thus were obtained varied cured films.

All these cured films obtained herein from the curable resin compositions of the present invention had good outward appearance. These cured films were examined with respect to their properties, which are shown in Table 4.

TABLE 4 (1-1)

|  | Example 1 | Example 2 | Example 3 | Example 4 |
|---|---|---|---|---|
| Resin (A) |  |  |  |  |
| Resin (A-1) | 1394 |  |  |  |
| Resin (A-2) |  | 1499 |  |  |
| Resin (A-3) |  |  | 1611 |  |
| Resin (A-4) |  |  |  | 1517 |
| Compound (B) |  |  |  |  |
| "GT-401" (B-1) | 29 |  |  |  |
| "L-117" |  | 470 |  |  |
| Pigment |  |  | 295 | 384 |
| "CR-93" | 538 | 538 | 538 | 538 |
| Curing Catalyst |  |  |  |  |
| TOMAAc | 5 |  | 5 | 5 |
| TBMAAc |  | 5 |  |  |

Notes to Table 4:
The numerals indicating the amounts of the raw materials used are all parts by weight.
GT-401: Abbreviation of "Epolead GT-401" (trade name of a polyepoxy compound produced by Daicel Chemical Industries, Ltd.)
CR-93: Abbreviation of "Tipaque CR-93" (trade name of a rutile-type titanium oxide produced by Ishihara Sangyo Kaisha, Ltd.)
L-117: Abbreviation of "Superbeckamine L-117-60" (trade name of an amino resin produced by Dainippon Ink and Chemicals Inc.)
TOMAAc: trioctylmethylammonium acetate
TBMAAc: tributylmethylammonium acetate

TABLE 4 (1-2)

|  | Example 1 | Example 2 | Example 3 | Example 4 |
|---|---|---|---|---|
| Curing Conditions |  |  |  |  |
| Curing Temperature (°C.) | 140 | 140 | 140 | 140 |
| Curing Time | 30 min | 30 min | 30 min | 30 min |
| Properties of Film |  |  |  |  |
| Weather Resistance | 98 | 95 | 93 | 85 |
| Water Repellency (1) | 83 | 86 | 85 | 82 |
| Water Repellency (2) | 80 | 81 | 79 | 73 |
| Acid Resistance | A | A | A | B |
| Scratch Resistance | 94 | 93 | 99 | 98 |

Notes to Table 4:
Weather Resistance:
After each sample was tested for 2,000 hours, using a sunshine carbon weathermeter according to the "Accelerated Weathering Test Methods" of JIS D 0205, the gloss was measured in terms of the 60-degree mirror reflectivity (%). The thus-measured gloss value of the exposed sample was divided by the gloss value of the un-exposed sample, and multiplied by 100 to obtain the gloss retention value (%) of each sample. The larger the value, the better the weather resistance of the sample.
Water Repellency (1):

TABLE 4 (1-2)-continued

|  | Example 1 | Example 2 | Example 3 | Example 4 |
|---|---|---|---|---|

This is the contact angle value (degree) between the un-exposed sample and water as the measure of the initial water repellency. The value was obtained by using an "Automatic Contact Angle Meter CA-Z Model" (produced by Kyowa Interface Science Co., Ltd.).
Water Repellency (2):
This is the contact angle value (degree) between water and the sample exposed for 2,000 hours using the above-described sunshine carbon weathermeter, as the measure of the water repellency after exposure.
Acid Resistance:
0.1 ml of an aqueous 10% sulfuric acid solution was put on a test panel coated with the cured film to be tested, and the panel was kept in an air-circulating oven at 70° C. for 30 minutes. Then, the panel was washed with water and dried, and the surface was observed visually.
The surface of each panel thus treated was evaluated according to the following criteria:
A: Not etched at all.
B: Etched a little.
C: The gloss of the surface was lowered.
D: Etched greatly.
Scratch Resistance:
The surface of each film was rubbed back and forth 30 times with a felt soaked with a 5% cleanser dispersion in water under a load of 54 KPa, then washed with water and dried. The surface gloss of each film thus treated was measured in terms of the 60-degree mirror reflectivity (%). The thus-measured gloss value of the rubbed sample was divided by the gloss value of the non-rubbed sample, and multiplied by 100 to obtain the gloss retention value (%) of each sample.
The larger the value, the better the scratch resistance of the sample.

TABLE 4 (2-1)

|  | Example 5 | Example 6 | Example 7 | Example 8 |
|---|---|---|---|---|
| Resin (A) |  |  |  |  |
| Resin (A-5) | 1427 |  |  |  |
| Resin (A-6) |  | 1634 |  |  |
| Resin (A-7) |  |  | 1611 |  |
| Resin (A-8) |  |  |  | 1829 |
| Compound (B) |  |  |  |  |
| "GT-401" |  |  |  | 60 |
| "L-117" | 463 |  |  |  |
| "990S" |  | 178 |  |  |
| "980K" |  |  | 215 |  |
| Pigment |  |  |  |  |
| "CR-93" | 538 | 538 | 538 | 538 |
| Curing Catalyst |  |  |  |  |
| TOMAAc | 5 |  |  | 5 |
| p-TSA |  | 1 |  |  |

Notes to Table 4:
The numerals indicating the amounts of the raw materials used are all parts by weight.
990S: Abbreviation of "Burnock DN-990S" (trade name of a polyisocyanate compound produced by Dainippon Ink and Chemicals Inc.)
908K: Abbreviation of "Burnock DB-980K-75" (trade name of a blocked polyisocyanate compound produced by Dainippon Ink and Chemicals Inc.)
p-TSA: para-toluenesulfonic acid

TABLE 4 (2-2)

|  | Example 5 | Example 6 | Example 7 | Example 8 |
|---|---|---|---|---|
| Curing Conditions |  |  |  |  |
| Curing Temperature (°C.) | 140 | room temperature | 160 | 140 |
| Curing Time | 30 min | 1 week | 30 min | 30 min |
| Properties of Film |  |  |  |  |
| Weather Resistance | 75 | 93 | 93 | 95 |
| Water | 83 | 82 | 86 | 83 |

TABLE 4 (2-2)-continued

|  | Example 5 | Example 6 | Example 7 | Example 8 |
|---|---|---|---|---|
| Repellency (1) |  |  |  |  |
| Water Repellency (2) | 63 | 78 | 82 | 78 |
| Acid Resistance | B–C | A | A | A |
| Scratch Resistance | 96 | 62 | 95 | 91 |

TABLE 4 (3-1)

|  | Example 9 | Example 10 | Example 11 | Example 12 |
|---|---|---|---|---|
| Resin (A) |  |  |  |  |
| Resin (A-9) | 1902 |  |  |  |
| Resin (A-10) |  | 1408 |  |  |
| Resin (A-11) |  |  | 1089 |  |
| Resin (A-12) |  |  |  | 1451 |
| Compound (B) |  |  |  |  |
| "A-187" | 30 |  |  |  |
| (B-2) |  | 554 | 845 |  |
| (B-3) |  |  |  | 509 |
| Pigment |  |  |  |  |
| "CR-93" | 538 | 538 | 538 | 538 |
| Curing Catalyst |  |  |  |  |
| DBTDO | 4 |  |  |  |
| TBMAAc |  | 36 |  |  |
| N-MIm |  |  | 10 |  |
| "AP-3" |  |  |  | 30 |

Notes to Table 4:
The numerals indicating the amounts of the raw materials used are all parts by weight.
A-187: Trade name of γ-glycidoxypropyltrimethoxysilane produced by Nippon Unicar Co., Ltd.
DBTDO: Abbreviation of dibutyl tin dioctoate
N-MIm: Abbreviation of N-methylimidazole (or 1-methylimidazole)
AP-3: trade name of isopropyl acid phosphate, produced by Daihachi Chemical Industry Co.

TABLE 4 (3-2)

|  | Example 9 | Example 10 | Example 11 | Example 12 |
|---|---|---|---|---|
| Curing Conditions |  |  |  |  |
| Curing Temperature (°C.) | room temperature | 140 | 140 | 140 |
| Curing Time | 1 week | 30 min | 30 min | 30 min |
| Properties of Film |  |  |  |  |
| Weather Resistance | 88 | 94 | 87 | 93 |
| Water Repellency (1) | 82 | 93 | 91 | 87 |
| Water Repellency (2) | 65 | 86 | 78 | 82 |
| Acid Resistance | B | A | A | B |
| Scratch Resistance | 59 | 92 | 92 | 90 |

TABLE 4 (4-1)

|  | Example 13 | Example 14 | Example 15 | Example 16 |
|---|---|---|---|---|
| Resin (A) |  |  |  |  |
| Resin (A-13) | 1114 |  |  |  |
| Resin (A-14) |  | 1492 |  |  |
| Resin (A-15) |  |  | 1374 |  |
| Resin (A-16) |  |  |  | 1930 |
| Compound (B) |  |  |  |  |
| "GT-401 |  |  |  | 35 |
| (B-3) |  | 473 |  |  |
| (B-4) | 794 |  | 549 |  |
| Pigment |  |  |  |  |
| "CR-93" | 538 | 538 | 538 | 538 |
| Curing Catalyst |  |  |  |  |
| DBTDO |  |  | 4 |  |
| N-MIm |  |  |  | 10 |
| "AP-3" | 30 | 30 |  |  |

Notes to Table 4:
The numerals indicating the amounts of the raw materials used are all parts by weight.

TABLE 4 (4-2)

|  | Example 13 | Example 14 | Example 15 | Example 16 |
|---|---|---|---|---|
| Curing Conditions |  |  |  |  |
| Curing Temperature (°C.) | 140 | 140 | 140 | 140 |
| Curing Time | 30 min | 30 min | 30 min | 30 min |
| Properties of Film |  |  |  |  |
| Weather Resistance | 87 | 92 | 95 | 94 |
| Water Repellency (1) | 91 | 88 | 91 | 89 |
| Water Repellency (2) | 78 | 83 | 82 | 84 |
| Acid Resistance | B | B | A | A |
| Scratch Resistance | 94 | 92 | 93 | 90 |
|  | 94 | 92 | 93 | 90 |

TABLE 4 (5)

|  | Comparative Example 1 | Comparative Example 2 |
|---|---|---|
| Resin (A) |  |  |
| Control Resin 1 | 1311 |  |
| Control Resin 2 |  | 1337 |
| Compound (B) |  |  |
| "L-117" | 500 |  |
| "990S" |  | 302 |
| Pigment |  |  |
| "CR-93" | 538 | 538 |
| Curing Conditions |  |  |
| Curing Temperature (°C.) | 140 | room |
| Curing Time | 30 min | 1 week |
| Properties of Film |  |  |
| Weather Resistance | 45 | 80 |
| Water Repellency (1) | 72 | 77 |

TABLE 4 (5)-continued

|  | Comparative Example 1 | Comparative Example 2 |
|---|---|---|
| Water Repellency (2) | 54 | 65 |
| Acid Resistance | D | B |
| Scratch Resistance | 89 | 31 |

INDUSTRIAL APPLICABILITY

As has been described above in detail, the curable resin composition of the present invention is novel and comprises (A) a resin obtained by condensation of a polymer having both a hydrolyzable silyl group and a particular functional group except such a hydrolyzable silyl group, and a particular polysiloxane, and (B) a compound capable of reacting with the functional group existing in the resin (A). The composition can form a cured film with high durability, especially high gloss retention and high water repellency retention even after exposure to light, and also high acid resistance and high scratch resistance. Therefore, the composition can be applied for various uses such as top-coating compositions for cars, coating compositions for exterior walls of constructions, heat-resistant coating compositions, adhesives, ink compositions, compositions to be infiltrated into fibers and paper, and surface-treating compositions.

We claim:

1. A curable resin composition comprising (A) a resin obtained by condensation of (a-1) a polymer having both a hydrolyzable silyl group and a functional group other than said hydrolyzable silyl group, and (a-2) a polysiloxane having a hydroxyl group bonded to a silicon atom and/or a hydrolyzable group bonded to a silicon atom, and (B) a compound having a functional group capable of reacting with said other functional group contained in said resin (A), wherein the compound (B) is blended with the resin (A) obtained by condensation of the polymer (a-1) and the polysiloxane (a-2).

2. A curable resin composition comprising (A) a resin obtained by condensation of (a-1) a polymer having both a hydrolyzable silyl group and a functional group other than said hydrolyzable silyl group, and (a-2) a polysiloxane having a hydroxyl group bonded to a silicon atom and/or a hydrolyzable group bonded to a silicon atom, (B) a compound having a functional group capable of reacting with said other functional group contained in said resin (A), and (C) a curing catalyst, wherein the compound (B) is blended with the resin (A) obtained by condensation of the polymer (a-1) and the polysiloxane (a-2).

3. The composition as claimed in claim 1 or 2, wherein, in said polymer (a-1) having both a hydrolyzable silyl group and a functional group except such a hydrolyzable silyl group, the hydrolyzable silyl group is an alkoxysilyl group.

4. The composition as claimed in claim 1 or 2, wherein, in said polymer (a-1) having both a hydrolyzable silyl group and a functional group except such a hydrolyzable silyl group, the functional group except such a hydrolyzable silyl group is at least one selected from the group consisting of a hydroxyl group, a blocked hydroxyl group, a carboxyl group, a blocked carboxyl group, a carboxylic acid anhydride group, an amino group, a cyclocarbonate group, an epoxy group, a primary amido bond, a secondary amido bond, a carbamate group, and a functional group represented by the following structural formula (I):

5. The composition as claimed in claim 1 or 2, wherein said polymer (a-1) having both a hydrolyzable silyl group and a functional group except such a hydrolyzable silyl group is a vinyl polymer.

6. The composition as claimed in claim 1 or 2, wherein said polymer (a-1) having both a hydrolyzable silyl group and a functional group except such a hydrolyzable silyl group is an acrylic polymer.

7. The composition as claimed in claim 1 or 2, wherein said polysiloxane (a-2) having a hydroxyl group bonded to a silicon atom and/or a hydrolyzable group bonded to a silicon atom is a hydrolysis-condensation product or partial hydrolysis-condensation product of a silicon compound having, in one molecule, at least two hydrolyzable groups bonded to a silicon atom.

8. The composition as claimed in claim 1 or 2, wherein said polysiloxane (a-2) having a hydroxyl group bonded to a silicon atom and/or a hydrolyzable group bonded to a silicon atom is a compound having, in one molecule, at least two alkoxyl groups bonded to a silicon atom.

9. The composition as claimed in claim 1 or 2, wherein said polysiloxane (a-2) having a hydroxyl group bonded to a silicon atom and/or a hydrolyzable group bonded to a silicon atom is at least one hydrolysis-condensation product or partial hydrolysis-condensation product of an alkoxysilane selected from the group consisting of tetraalkoxysilanes, organotrialkoxysilanes, diorganodialkoxysilanes, and partial hydrolysis-condensation products and partial cohydrolysis-condensation product thereof.

10. The composition as claimed in claim 1 or 2, wherein said compound (B) is at least one selected from the group consisting of polyisocyanate compounds; blocked polyisocyanate compounds; polyepoxy compounds; polycyclocarbonate compounds; amino resins; primary or secondary amido bond-containing compounds; polycarboxyl compounds; polyhydroxy compounds; and compounds having, in one molecule, both an epoxy group and a hydrolyzable group bonded to a silicon atom.

11. The composition as claimed in claim 1 or 2, wherein said compound (B) is a compound having, in one molecule, both an epoxy group and an alkoxy group bonded to a silicon atom.

* * * * *